(12) United States Patent
Oba

(10) Patent No.: US 11,524,698 B2
(45) Date of Patent: Dec. 13, 2022

(54) INFORMATION PROCESSING APPARATUS AND INFORMATION PROCESSING METHOD

(71) Applicant: Sony Semiconductor Solutions Corporation, Kanagawa (JP)

(72) Inventor: Eiji Oba, Tokyo (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 225 days.

(21) Appl. No.: 16/757,366

(22) PCT Filed: Oct. 17, 2018

(86) PCT No.: PCT/JP2018/038740
§ 371 (c)(1),
(2) Date: Apr. 17, 2020

(87) PCT Pub. No.: WO2019/082774
PCT Pub. Date: May 2, 2019

(65) Prior Publication Data
US 2021/0188301 A1    Jun. 24, 2021

(30) Foreign Application Priority Data
Oct. 24, 2017   (JP) ............................. JP2017-205671

(51) Int. Cl.
*B60W 50/14* (2020.01)
*B60W 60/00* (2020.01)
(Continued)

(52) U.S. Cl.
CPC ............. *B60W 50/14* (2013.01); *B60K 35/00* (2013.01); *B60W 60/005* (2020.02);
(Continued)

(58) Field of Classification Search
CPC ............... B60W 50/14; B60W 60/005; B60W 2050/146; B60W 40/04; B60K 35/00;
(Continued)

(56) References Cited

U.S. PATENT DOCUMENTS

2004/0249568 A1   12/2004  Endo et al.
2012/0054171 A1*   3/2012  Gosset .................. G06F 16/951
                                                  707/E17.108
(Continued)

FOREIGN PATENT DOCUMENTS

DE   102010063339 A1 *  6/2012  ............. B60K 35/00
JP       2011-075436 A     4/2011
(Continued)

OTHER PUBLICATIONS

Machine Translation of Breisinger (DE 102010063339 A1) (Year: 2012).*

(Continued)

*Primary Examiner* — James J Lee
*Assistant Examiner* — Alexander George Matta
(74) *Attorney, Agent, or Firm* — Wolf, Greenfield & Sacks, P.C.

(57) ABSTRACT

Section information of a traveling route is provided appropriately to a driver.
Traveling route information and traffic information relating to the traveling route are acquired, and on the basis of the information, a driver intervention requiring section and an automatic driving available section of the traveling route are displayed on a reach prediction time axis from a current point on an instrument panel, a tablet, or the like. For example, the driver intervention requiring section includes a manual driving section, a takeover section from automatic driving to manual driving, and a cautious traveling section from the automatic driving.

11 Claims, 24 Drawing Sheets

(51) Int. Cl.
B60K 35/00 (2006.01)
G01C 21/36 (2006.01)
(52) U.S. Cl.
CPC .... *G01C 21/3691* (2013.01); *B60K 2370/175* (2019.05); *B60W 2050/146* (2013.01)
(58) Field of Classification Search
CPC .................. B60K 2370/175; G01C 21/367; G01C 21/26; G01C 21/36; G01C 21/3691; G08G 1/16
See application file for complete search history.

(56) References Cited

U.S. PATENT DOCUMENTS

| 2013/0173531 | A1* | 7/2013 | Rinearson | G06F 16/80 |
| | | | | 707/608 |
| 2016/0298976 | A1* | 10/2016 | Sato | G08G 1/096827 |
| 2017/0147989 | A1* | 5/2017 | Onimaru | G08G 1/0145 |
| 2017/0303842 | A1 | 10/2017 | Yoshiba et al. | |
| 2018/0283896 | A1* | 10/2018 | Piemonte | G01C 21/367 |
| 2019/0056732 | A1* | 2/2019 | Aoi | B60W 50/082 |

FOREIGN PATENT DOCUMENTS

| JP | 2015-141052 A | 8/2015 |
| JP | 2016-064773 A | 4/2016 |
| JP | 2016-090274 A | 5/2016 |
| JP | 2016-139204 A | 8/2016 |
| WO | WO 2017/086079 A1 | 5/2017 |

OTHER PUBLICATIONS

International Search Report and English translation thereof dated Jan. 22, 2019 in connection with International Application No. PCT/JP2018/038740.

International Written Opinion and English translation thereof dated Jan. 22, 2019 in connection with International Application No. PCT/JP2018/038740.

International Preliminary Report on Patentability and English translation thereof dated May 7, 2020 in connection with International Application No. PCT/JP2018/038740.

Extended European Search Report dated Nov. 30, 2020 in connection with European Application No. 18869499.6.

* cited by examiner

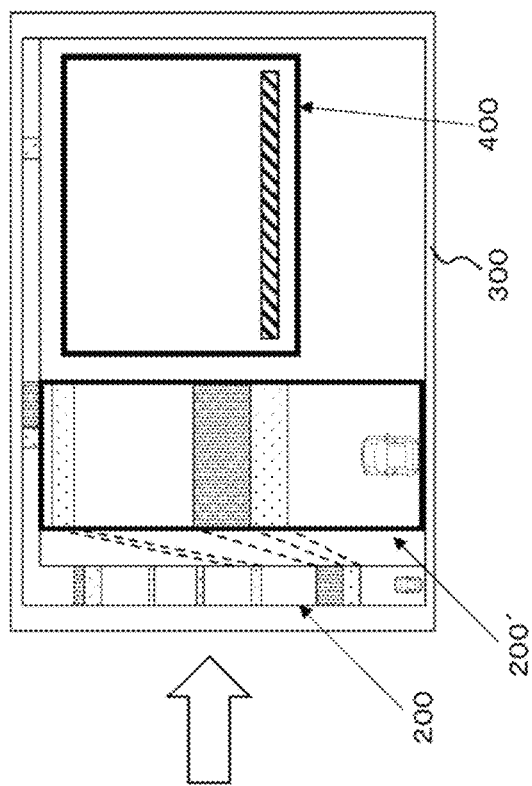
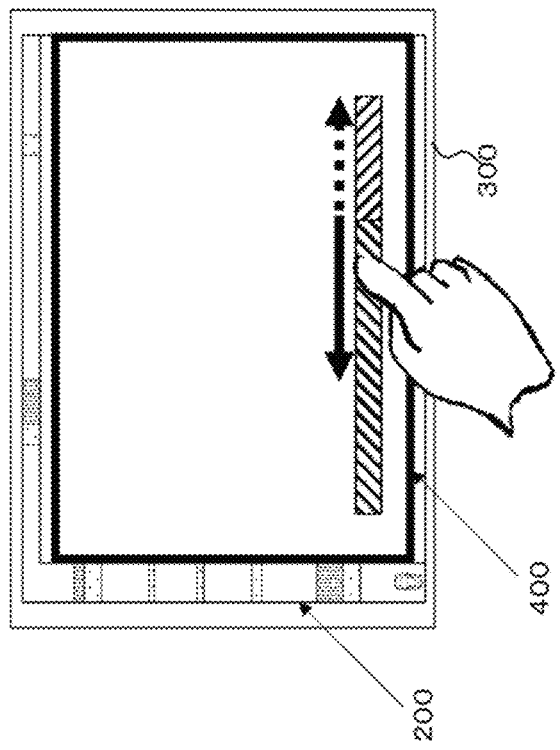
FIG. 21

INFORMATION PROCESSING APPARATUS AND INFORMATION PROCESSING METHOD

CROSS-REFERENCE TO RELATED APPLICATIONS

This application claims the benefit under 35 U.S.C. § 371 as a U.S. National Stage Entry of International Application No. PCT/JP2018/038740, filed in the Japanese Patent Office as a Receiving Office on Oct. 17, 2018, which claims priority to Japanese Patent Application Number JP2017-205671, filed in the Japanese Patent Office on Oct. 24, 2017, each of which is hereby incorporated by reference in its entirety.

TECHNICAL FIELD

The present technology relates to an information processing apparatus and an information processing method, and particularly to an information processing apparatus and so forth for displaying information relating to a traveling route.

BACKGROUND ART

In recent years, development of a system is being proceeded which automatically performs control and support of traveling of a vehicle independently of an operation of a driver in order to achieve improvement in safety of vehicle traveling, reduction in load on the driver, and so forth. In the future, capability of execution of a secondary task in a vehicle during automatic driving is expected. However, as a present road infrastructure, it is assumed that introduction of an environmental infrastructure as a traveling route in which a driver intervention requiring section that is a section requiring a so-called manual driving, and an automatic driving available section are mixed in a speckled manner, progresses. Therefore, in order to allow a driver to perform execution of a secondary task favorably, it is necessary to appropriately provide section information such as manual or automatic driving sections on the traveling route, and it is necessary for the latest information for each progress section during traveling to be ready for a change of the situation that changes every moment. Further, section end points for such automatic driving may not necessarily be fixed.

For example, PTL 1 discloses a technology of displaying, in regard to each of a plurality of risks on a road on which an own vehicle is to travel, a degree of the risk. Meanwhile, for example, PTL 2 discloses a technology of displaying, in a case where a driver is to be urged to start manual driving during automatic driving, that the vehicle is in a situation in which manual driving must be started on the screen of a portable terminal to notify the driver whose consciousness is concentrated on the portable terminal.

CITATION LIST

Patent Literature

[PTL 1]
Japanese Patent Laid-Open No. 2016-139204
[PTL 2]
Japanese Patent Laid-Open No. 2016-090274

SUMMARY

Technical Problems

Although maturity of a vehicle environment recognition technology for performing automatic driving, development of map information of a road traveling environment, and so forth are raising the momentum of utilizing automatic driving of a vehicle in an actual world space at present, actually it is difficult to implement a closed-track-equipped environmental space in which automatic driving is partly available like a subway in any continuous section in which a vehicle can travel. Actually, the continuous section actually is a traveling section in which roads of driving levels that allow any automatic driving and roads that do not allow any automatic driving are connected at random. Therefore, it is anticipated that road environments are configured from sections in which automatic driving is available to sections that are under driver supervision or essentially require manual driving intervention or the like. Further, in the case of traveling on such mixed road sections, if return to manual driving that is requested to the driver upon crossing sections is not performed precisely, the vehicle cannot continue traveling, and therefore, it becomes necessary for the vehicle to emergently stop. Therefore, there is a significant subject that utilization of the social infrastructure as a road is disturbed. Furthermore, the spread of automatic driving faces such a contradiction that it cannot be satisfied unless an environment is implemented in which automatic driving can be achieved continuously in all sections in the society as a whole and environment maintenance is complete all the time without obstructing traveling.

Therefore, a concept that only a closed environment is utilized for fully automatic driving or a proposal to emergently stop a vehicle in a case where appropriate takeover from automatic driving to manual driving cannot be performed are provided. Actually, however, if emergently stopping vehicles overflow in a road infrastructure, this induces traffic jams in a road environment, or increase of such emergently stopping vehicles induces an accident that has not been occurred in the past. Thus, a problem that normal social activities are inhibited occurs as a new problem, and after all, a method for widely spreading automatic driving has not been found out.

For example, even if driving of the level 3 of automatic driving that is widely discussed currently is introduced just simply into the society in general roads or exclusive road sections, for example, in order to satisfy the driving without a negative social impact such as jams, it is necessary that the environment in which a vehicle can travel at the level 3 on the road all the time is maintained 100% in the section and the driver returns with certainty at an end spot. Further, during the period, the driver is demanded to always take the responsibility for monitoring without being directly engaged in driving and keep the state under tense state with attention. In short, if human ergonomic and psychological aspects of the human are taken into consideration, there is a subject that long term utilization according to the applicable concept is not realistic, and this is a subject to socially introduce automatic driving in a wide area, and a solution of the subject is demanded.

The object of the present technology is to normally provide, in order to deal with the subjects described above, section information of a traveling route to the driver before the vehicle approaches a return requiring section in various road environments by actively adjusting the control in response to a state of the driver, a traveling property of the vehicle, information regarding a road environment, and so forth to provide appropriate necessary intervention information to the driver in advance thereby to seamlessly achieve section passage with a high probability without stopping the vehicle. For introduction of automatic driving, since the subject that a precise driver return technology upon crossing these sections cannot be implemented is not successfully solved as yet, the section whose social introduction is possible is very restrictive such as a specific expressway section or an established section.

Solution to Problems

The concept of the present technology resides in an information processing apparatus including an information acquisition unit configured to acquire traveling route information and traffic information relating to the traveling route, and a display controlling unit configured to update and display a driver intervention requiring section, traveling property on the traveling route of an own vehicle, and an automatic driving available section of the traveling route on a reach prediction time axis from a point at which the own vehicle is currently traveling so as to be intuitively recognizable on a display device all the time on the basis of the traveling route information and the traffic information.

In the present technology, the information acquisition unit acquires traveling route information and traffic information relating to the traveling route. Further, according to active decision state of a return delay characteristic of a particular driver in a particular vehicle taking the traveling property of the own vehicle at the time, in the weather, and the like, into consideration, the display controlling unit displays a driver intervention requiring section and an automatic driving available section of the traveling route on a reach prediction time axis from the current point on the display device on the basis of the traveling route information and the traffic information. For example, the display device may be a display device provided in a portable terminal, and the information processing apparatus may further include a communication unit configured to communicate with the portable terminal.

Although the technology for performing specification notification like that of PTL 1 or PTL 2 is known, since the technology does not perform optimization notification of return to manual driving from automatic driving taking a return delay characteristic into account in response to an environmental condition change, supposed by popularization of automatic driving, of a traveling route that changes every moment, a loading weight and a braking capacity of an own vehicle, further, a return characteristic of a driver, and still further, a state of the driver, the notification performed every time is performed at a timing different from a timing at which it is required by actual driving, and therefore, the necessity for actual return responsive to the notification gradually becomes ambiguous. Different from a notification at passage of a prescribed point for each predetermined passage point supposed to be provided to such drivers in the past, information necessary for driving intervention return to a driver is provided more accurately at an appropriate timing and with an accurate time sense to the driver. Therefore, optimization of the notification is achieved in that it is not too early and not too late. As a result, a main vehicle traveling along a road can appropriately perform takeover from automatic driving to manual driving appropriately even if an environmental change and the like occurs every moment, and this decreases the burden on the road infrastructure caused by failure in takeover. Thus, even if an automatic driving vehicle is introduced, operational failure of the social road infrastructure is not caused. The operational failure of the infrastructure described here refers to all that, in a case where a vehicle in which takeover from automatic driving to manual driving is not performed normally appears frequently, in a road section in which the vehicle traffic bandwidth of the road infrastructure is narrow, if many emergently slowdown vehicles or stopping vehicles appear, the flow of vehicles in the applicable road section is slowed down or disturbed, resulting in failure to maintain a normal traffic amount.

For example, in a case where route setting is performed and traveling is performed, on a map to be presented to the driver, the driver intervention requiring section may include a manual driving section, a takeover section from automatic driving to manual driving, and a cautious traveling section from the automatic driving. In this case, for example, the display controlling unit may display the automatic driving available section in a first color, display the manual driving section in a second color, and display the takeover section and the cautious traveling section in a third color. This makes it possible for the driver to visually observe a manual driving section, a takeover section from automatic driving to manual driving, a cautious traveling section from the automatic driving and an automatic driving available section on a traveling route. However, in a case where the driver does not have a sense of an average passage speed in each section normally utilizing the applicable route section, if only section display is made on the map, then the temporal sense until a point at which driving intervention is required is reached is entrusted to rules of thumb, and it is difficult to intuitively know a time margin in regard to what can be done till the takeover point.

Therefore, it is necessary for the driver to preferentially put a matter of a return point normally to consciousness during a work of a secondary task, which is a maximum benefit of automatic driving in the past, and this makes an obstruction to execution of the secondary task. Simultaneously, when an increase of attention is demanded upon return as a result of the fact that continued attention is forced for an unnecessary period, if the tension state with attention for a long period of time in secondary task activities during the period continues, the perceptual cognitive sensation is paralyzed and the attention for return becomes ambiguous. However, where the reach prediction time from each current point to each takeover point is always updated and displayed intuitively as a time axis, by utilization of both of execution of a secondary task with a secure feeling and timely notification, the return point is always known suitably in advance, and recognition of a takeover point can be performed easily and timely.

Further, for example, the display controlling unit may display a first section from the current point to a first point on a first time axis, display a second section from the first point to a second point in a time axis that sequentially changes from the first time axis to a second time axis reduced at a predetermined ratio with respect to the first time axis, and display a third section from the second point to a third point on the second time axis. This makes it possible for the driver to particularly know section information nearest in time in a limited display space and know section information farther in time.

In this case, for example, the display controlling unit may display the first section with a first width, display the second section with a width that sequentially changes from the first width to a second width smaller than the first width, and display the third section with the second width. This makes it possible for the driver to visually and intuitively recognize a degree of reduction of the time axis in the second section and the third section with respect to the first section.

Further, in this case, the driving vehicle intervention requiring section in the third section may be displayed with a fixed time length even if the driving vehicle intervention requiring section actually is equal to or smaller than the fixed time length. This makes it possible to display, in the third section in which the time axis is reduced by a great amount, the driving vehicle intervention requiring section of a short period so as to be easily recognizable by the driver.

Further, for example, the display controlling unit may further display information relating to a point designated in each of the displayed sections. This makes it possible for the driver to designate an arbitrary point in each section and acquire information relating to the point.

Further, for example, the display controlling unit may display the driving vehicle intervention requiring section that appears newly so as to be identifiable from the existing driving vehicle intervention requiring section. In this case, for example, the newly appearing driving vehicle intervention requiring section is flickering displayed or displayed in a different color. This makes it possible for the driver to easily recognize the newly appearing driving vehicle intervention requiring section and explicitly grasp a plan to be coped with or changed in regard to traveling planning having been planned before the appearance of the additional event.

Further, for example, when the driver intervention requiring section comes in a range of a fixed period of time from the current point, the driver intervention requiring section, the display controlling unit may put into an emphatically displayed state. In this case, for example, flickering display, display in a different color, illusion display by which the moving speed looks higher than an actual speed or, for example, wave display is used. This makes it possible for the driver to easily recognize that a driver intervention requiring section comes in a range of a fixed period of time from the current point. The flickering display of the dynamic display acts to stimulate the human dynamic visual acuity and is a method that uses means useful for calling for attention.

Further, for example, the display controlling unit may display images in the sections in parallel to a work window. This makes it possible for the driver, who is performing a work with the work window, to easily recognize a driver intervention requiring section and an automatic driving available section of the traveling route on the reach prediction time axis from the current point. In a case where a secondary task is performed using the same equipment, desirably the equipment is a display apparatus that can execute multitasks, and it may be displayed as a sub window in the case of a tablet terminal or a smartphone terminal or may be a video player, a game terminal, a video conference system, or the like.

In this manner, in the present technology, a driver intervention requiring section and an automatic driving available section of a traveling route are displayed on a reach prediction time axis from the current point on a display device on the basis of traveling route information and traffic information. Therefore, section information for traveling for the time being of the traveling route can be provided appropriately to the driver. The display update method for them needs to be performed by the driver who accurately grasps the section approach information and has consciousness. However, on the other hand, if information is always updated and displayed in the field of view of the driver, then in the cognitive function of the driver, filtering sometimes acts such that, although the information enters as light into the eyes, the contents of the display information is consciously excluded. Although the filtering effect of normally displayed information by the driver becomes one of factors of overlooking of information, the factor can be reduced or avoided by introduction of an interactive confirmation response procedure with the driver.

Advantageous Effects of Invention

According to the present technology, detailed and timely information of a section in which driving intervention for a fixed period of time in a planned traveling route is required can be provided appropriately to the driver. Further, as a significant effect although it is indirect, driving intervention return of the driver is implemented precisely with a high probability in regard to a vehicle that travels in the automatic driving mode in a section in which automatic driving is available, another section in which manual driving is requested or in an automatic driving passable section with care. As a result, also an effect can be anticipated that automatic driving vehicle can be introduced without disturbing normal utilization of the road infrastructure under an infrastructure environment into which an environment in which automatic driving is possible is introduced in a mixed manner. It is to be noted that the advantageous effects described in the present specification are illustrative only and are not restrictive, and other advantageous effects may be applicable.

BRIEF DESCRIPTION OF DRAWINGS

FIG. 21 depicts views each illustrating an example of a display of reduction in a secondary task execution window or the like of a restart return point designation slider menu or a secondary task execution window in a case where there is no acknowledge response of a performer of a secondary task, which are displayed on a terminal.

DESCRIPTION OF EMBODIMENT

In the following, a mode for carrying out the invention (hereinafter referred to as an "embodiment") is described. It is to be noted that the description is given in the following order.
1. Embodiment
2. Modifications 1. Embodiment

[Configuration of Automatic Driving Controlling System]

Figure 1:
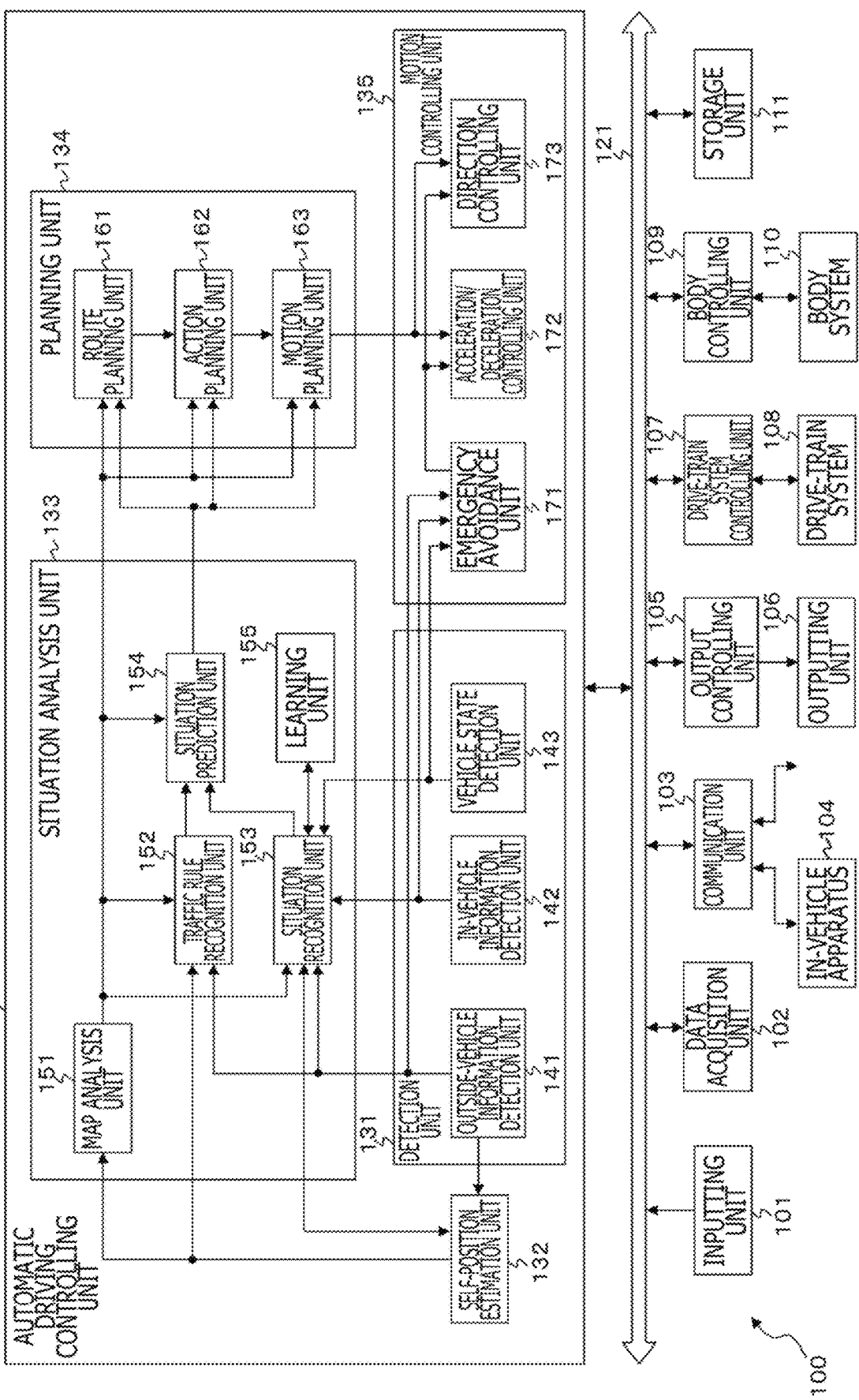
FIG. 1 is a block diagram depicting an example of a configuration of a vehicle controlling system.

FIG. 1 depicts an example of a configuration of a vehicle controlling system 100 as the embodiment. It is to be noted that, in a case where a vehicle in which the vehicle controlling system 100 is provided is distinguished from any other vehicle, it is referred to as an own car or an own vehicle.

The vehicle controlling system 100 includes an inputting unit 101, a data acquisition unit 102, a communication unit 103, an in-vehicle apparatus 104, an output controlling unit 105, an outputting unit 106, a drive-train system controlling unit 107, a drive-train system 108, a body controlling unit 109, a body system 110, a storage unit 111, and an automatic driving controlling unit 112.

The inputting unit 101, the data acquisition unit 102, the communication unit 103, the output controlling unit 105, the drive-train system controlling unit 107, the body controlling unit 109, the storage unit 111, and the automatic driving controlling unit 112 are connected to each other by a communication network 121. The communication network 121 includes an in-vehicle communication network, a bus, or the like that complies with an arbitrary standard such as, for example, CAN (Controller Area Network), LIN (Local Interconnect Network), LAN (Local Area Network), or FlexRay (registered trademark). It is to be noted that the components of the vehicle controlling system 100 are sometimes connected directly to each other without the intervention of the communication network 121.

It is to be noted that, in the description hereinafter given, in a case where the components of the vehicle controlling system 100 communicate with each other through the communication network 121, description of the communication network 121 is omitted. For example, in a case where the inputting unit 101 and the automatic driving controlling unit 112 communicate with each other through the communication network 121, this is simply described as follows: the inputting unit 101 and the automatic driving controlling unit 112 communicate with each other.

The inputting unit 101 includes a device that is used to input various data, instructions, and so forth by a passenger. For example, the inputting unit 101 includes operation devices such as a touch panel, buttons, a microphone, switches, and levers, as well as operation devices capable of inputting by a method other than a manual driving through a voice, a gesture, or the like. Further, for example, the inputting unit 101 may be a remote control apparatus that utilizes infrared rays or other electromagnetic waves or an external connection apparatus such as a mobile apparatus, a wearable apparatus, or the like, which are ready for an operation of the vehicle controlling system 100. The inputting unit 101 generates an input signal on the basis of data, an instruction, or the like inputted by a passenger and supplies the input signal to the components of the vehicle controlling system 100.

The data acquisition unit 102 includes various sensors for acquiring data to be used for processing of the vehicle controlling system 100 and supplies the acquired data to the components of the vehicle controlling system 100.

For example, the data acquisition unit 102 includes various sensors for detecting a state and so forth of the own vehicle. In particular, for example, the data acquisition unit 102 includes a gyro sensor, an acceleration sensor, an inertial measurement device (IMU), sensors for detecting an operation amount of an accelerator pedal, an operation amount of a brake pedal, a steering angle of a steering wheel, an engine speed, a motor speed, a rotational speed of wheels and so forth, and other necessary sensors.

Further, the data acquisition unit 102 includes various sensors for detecting information outside the own vehicle, for example. In particular, the data acquisition unit 102 includes an imaging apparatus such as a ToF (Time Of Flight) camera, a stereo camera, a monocular camera, an infrared camera, and other cameras, for example. Further, the data acquisition unit 102 includes an environment sensor for detecting the weather, meteorological phenomenon, or the like, and surrounding information detection sensors for detecting an object around the own vehicle, for example. The environment sensor includes a rain drop sensor, a fog sensor, a sunshine sensor, and a snow sensor, and the like, for example. The surrounding information detection sensor includes, for example, an ultrasonic sensor, a radar, a LiDAR (Light Detection and Ranging, Laser Imaging Detection and Ranging), a sonar, and so forth.

Figure 2:
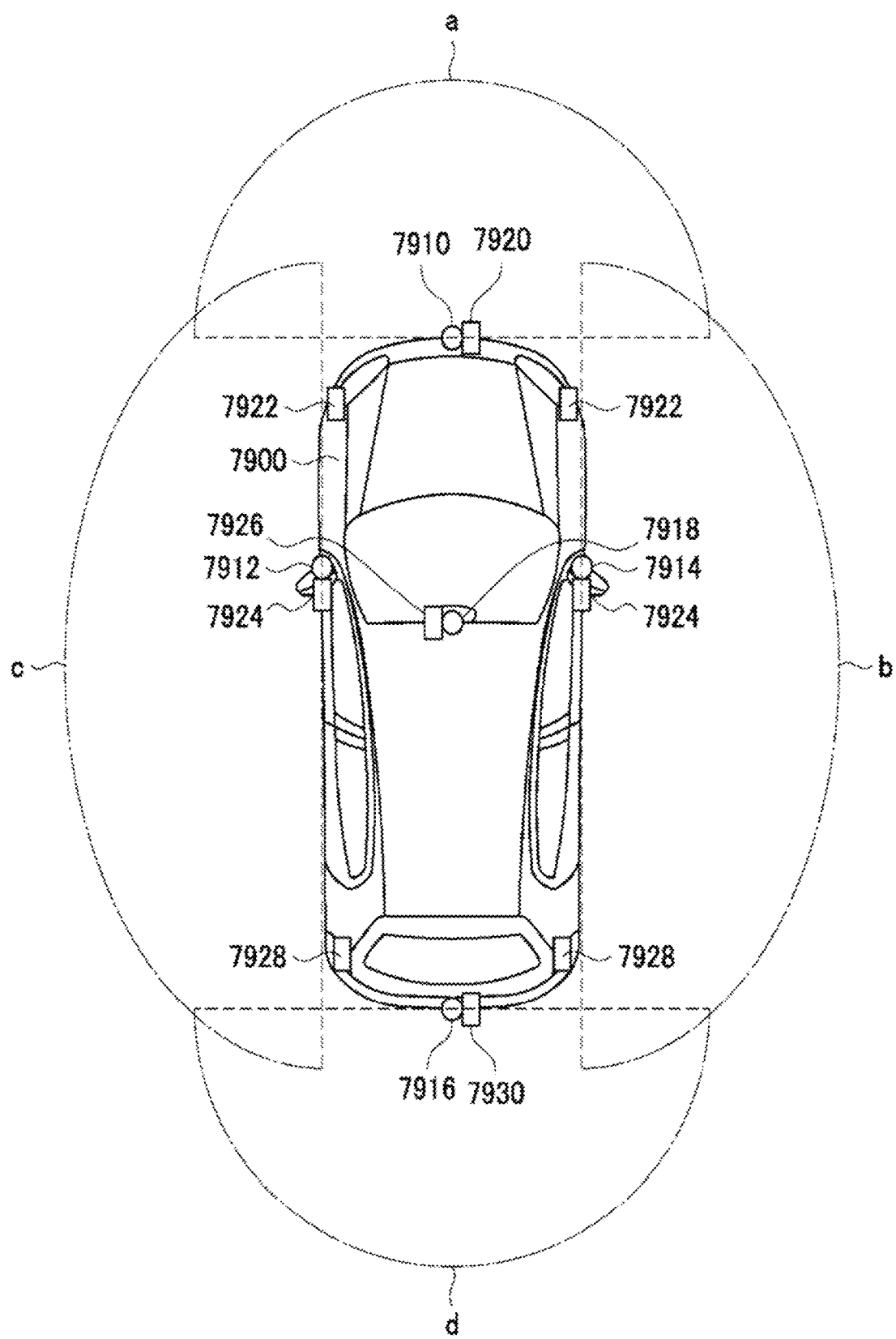
FIG. 2 is a view depicting an example of installation of various sensors for detecting external information of an own vehicle.

For example, FIG. 2 depicts an example of installation of various sensors for detecting external information of the own vehicle. Imaging apparatuses 7910, 7912, 7914, 7916, and 7918 are provided at at least one of positions on a front nose, side mirrors, a rear bumper, a back door of the vehicle 7900, or at a position on an upper portion of a windshield within the interior of the vehicle.

The imaging apparatus 7910 provided on the front nose and the imaging apparatus 7918 provided at the upper portion of the windshield in the interior of the vehicle acquire images principally ahead of the vehicle 7900. The imaging apparatuses 7912 and 7914 provided on the side mirrors acquire images principally of the sides of the vehicle 7900. The imaging apparatus 7916 provided on the rear bumper or the back door acquires an image principally behind the vehicle 7900. The imaging apparatus 7918 provided at the upper portion of the windshield in the interior of the vehicle is used for detection principally of a preceding vehicle or of a pedestrian, an obstacle, a traffic light, a traffic sign, a lane track, and so forth. Further, in automatic driving in the future, the imaging apparatus 7918 may be extensionally utilized to a pedestrian crossing a road ahead of a left or right turn in an wider area range when the vehicle turns to the left or right or further to a range of an approaching substance on a crossing road.

It is to be noted that, in FIG. 2, an example of imaging ranges of the imaging apparatuses 7910, 7912, 7914, and 7916 is depicted. An imaging range a indicates an imaging range of the imaging apparatus 7910 provided on the front nose; imaging ranges b and c depict imaging ranges of the imaging apparatuses 7912 and 7914 provided on the side mirrors, respectively; and an imaging range d indicates an imaging range of the imaging apparatus 7916 provided on the rear bumper or the back door. For example, by overlaying image data captured by the imaging apparatuses 7910, 7912, 7914, and 7916, a bird's eye image of the vehicle 7900 viewed from above, an omnidirectional three-dimensional display image surrounding the vehicle periphery with curved planes, and so forth are obtained.

The sensors 7920, 7922, 7924, 7926, 2928, and 7930 provided on the front, rear, sides, and corners of the vehicle 7900 and at the upper portion of the windshield in the interior of the vehicle may be, for example, ultrasonic sensors or radars. The sensors 7920, 7926, and 7930 provided on the front nose, rear bumper and backdoor and at the upper portion of the windshield in the interior of the vehicle may each be, for example, a LiDAR. The sensors 7920 to 7930 are used for detection principally of a preceding vehicle, a pedestrian, an obstacle, or the like. A result of such detection may be applied further to improvement in three-dimensional object display of the bird's eye display or omnidirectional stereoscopic display.

Referring back to FIG. 1, for example, the data acquisition unit 102 includes various sensors for detecting the current position of the own vehicle. In particular, the data acquisition unit 102 includes, for example, a GNSS receiver for receiving GNSS signals from GNSS (Global Navigation Satellite System) satellites, and so forth.

Further, the data acquisition unit 102 includes various sensors, for example, for detecting information regarding the inside of the vehicle. In particular, for example, the data acquisition unit 102 includes an imaging apparatus for imaging the driver, a biological sensor for detecting biological information of the driver, a microphone for collecting sound in the interior of the vehicle and so forth. The biological sensor is provided, for example, on a seat face, the steering wheel, or the like and detects a sitting state of a passenger sitting on a seat or biological information of the driver who grabs the steering wheel. As a biological signal, diversified observable data of a heart rate, a pulse rate, a blood flow, breathing, a mind-body correlation, a visual stimulus, brain waves, sweating, a drift, a head posture behavior, the eyes, gaze, a blink, a saccade, a micro saccade, fixation, staring, an iris pupil reaction, and so forth can be utilized.

The communication unit 103 performs communication with the in-vehicle apparatus 104 as well as various apparatuses, servers, base stations, and so forth outside the vehicle to transmit data supplied from the components of the vehicle controlling system 100 and supplies received data to the components of the vehicle controlling system 100. It is to be noted that the communication protocol supported by the communication unit 103 is not specifically restricted, and also it is possible for the communication unit 103 to support a plurality of kinds of communication protocols.

For example, the communication unit 103 performs wireless communication with the in-vehicle apparatus 104 through a wireless LAN, Bluetooth (registered trademark), NFC (Near Field Communication), WUSB (Wireless USB), or the like. Further, the communication unit 103 performs wired communication with the in-vehicle apparatus 104 through a connection terminal not depicted (and a cable if necessary) by an USB (Universal Serial Bus), an HDMI (High-Definition Multimedia Interface), an MHL (Mobile High-definition Link), or the like.

Furthermore, the communication unit 103 performs communication, for example, with an apparatus (for example, an application server or a control server) existing in an external network (for example, the Internet, a cloud network or a network unique to a provider) through a base station or an access point. Further, the communication unit 103 performs communication with a terminal existing in the neighborhood of the own vehicle (for example, a terminal of a pedestrian or a shop or an MTC (Machine Type Communication) terminal), for example, using the P2P (Peer To Peer) technology. Furthermore, the communication unit 103 performs V2X communication such as, for example, vehicle to vehicle (Vehicle to Vehicle) communication, road to vehicle (Vehicle to Infrastructure) communication, communication between the own vehicle and a home (Vehicle to Home), and pedestrian to vehicle (Vehicle to Pedestrian) communication. Further, the communication unit 103 includes a beacon reception unit, for example, and receives a radio wave or an electromagnetic wave originated from a wireless station or the like installed on a road to acquire information regarding the current position, traffic jams, traffic rules, required time, or the like. It is to be noted that pairing with a vehicle traveling ahead during traveling in a section, the vehicle which can become a leading vehicle through the communication unit such that information acquired by a data acquisition unit incorporated in the vehicle traveling ahead is acquired as pre-traveling information and is used complementarily with the data of the data acquisition unit 102 of the own vehicle, and this becomes means for assuring higher safety of a line of subsequent vehicles, especially in a case of a line traveling by a leading vehicle, followed by the subsequent vehicles, for example.

The in-vehicle apparatus 104 includes, for example, mobile equipment (a tablet, a smartphone, or the like) or a wearable device owned by a passenger, information equipment carried in or attached to the own vehicle, a navigation apparatus for performing a route search to an arbitrary destination, and so forth. It is to be noted that, if it is taken into consideration that, as a result of spread of automatic driving, an occupant is not necessarily fixed to a sitting fixed position, the in-vehicle apparatus 104 may be extensionally utilized to a video reproduction device, a game device, or an apparatus that can be removed from an installation position of the same. Although the present embodiment is described in connection with an example in which presentation of information of an intervention requiring point of the driver is restricted to the applicable driver, information provision may be performed further to a subsequent vehicle in a line traveling or the like or may be further utilized suitably in combination with traveling support at a remote place by normally giving information to a service operation control center for passenger transport carpool buses or long-distance logistics commercial vehicles.

The output controlling unit 105 controls outputting of various kinds of information to a passenger of the own vehicle or to the outside of the vehicle. For example, the output controlling unit 105 generates an output signal including at least one of visual information (for example, image data) and auditory information (for example, sound data) and supplies the output signal to the outputting unit 106 to control outputting of the visual information and the auditory information from the outputting unit 106. In particular, the output controlling unit 105 synthesizes image data captured by a different imaging apparatus of the data acquisition unit 102 to generate a bird's eye image, a panorama image, or the like and supplies an output signal including the generated image to the outputting unit 106. Further, the output controlling unit 105 generates sound data including, for example, warning sound, a warning message, or the like against a risk of collision, contact, entering into a danger zone, or the like and supplies an output signal including the generated sound data to the outputting unit 106.

The outputting unit 106 includes an apparatus capable of outputting visual information or auditory information to a passenger of the own vehicle or to the outside of the vehicle. For example, the outputting unit 106 includes a display apparatus, an instrument panel, an audio speaker, a headphone, a wearable device such as a glasses type display to be worn by a passenger, a projector, a lamp, and so forth. The display apparatus provided in the outputting unit 106 may be not only an apparatus having an ordinary display, but also an apparatus for displaying visual information in the visual field of the driver such as, for example, a head-up display, a transmission type display or an apparatus having an AR (Augmented Reality) display function.

The drive-train system controlling unit 107 generates various control signals and supplies them to the drive-train system 108 to perform control of the drive-train system 108. Further, the drive-train system controlling unit 107 supplies control signals to the components other than the drive-train system 108 to perform notification of a control state of the drive-train system 108 and so forth as occasion demands.

The drive-train system 108 includes various apparatuses relating to the drive system of the own vehicle. For example, the drive-train system 108 includes a driving force generation apparatus for generating driving force such as an internal combustion engine or a drive motor, a driving force transmission mechanism for transmitting the driving force to the axles, a steering mechanism for adjusting the steering angle, a brake system for generating braking force, an ABS (Antilock Brake System), an ESC (Electronic Stability Control), an electric power steering apparatus, and so forth.

The body controlling unit 109 generates various control signals and supplies them to the body system 110 to perform control of the body system 110. Further, the body controlling unit 109 supplies control signals to the components other than the body system 110 to perform notification of a control state of the body system 110, and so forth as occasion demands.

The body system 110 includes various apparatuses of the body system equipped on the vehicle body. For example, the body system 110 includes a keyless entry system, a smart key system, a power window apparatus, power seats, a steering wheel, an air conditioning apparatus, various lamps (for example, a headlamp, a back lamp, a brake lamp, a turn signal, a fog lamp, and so forth), and so forth.

The storage unit 111 includes magnetic storage devices such as, for example, a ROM (Read Only Memory), a RAM (Random Access Memory), and an HDD (Hard Disc Drive), a semiconductor storage device, an optical storage device, a magneto-optical storage device, and so forth. The storage unit 111 stores various programs, data, and so forth to be used by the components of the vehicle controlling system 100. For example, the storage unit 111 stores map data of a three-dimensional high precision map such as a dynamic map, a global map that is lower in accuracy than the high precision map but covers a wider area, a local map including information around the own vehicle and so forth.

The automatic driving controlling unit 112 performs control relating to automatic driving such as autonomous traveling, driving assistance and so forth. In particular, for example, the automatic driving controlling unit 112 performs cooperative control for an aim of implementation of the ADAS (Advanced Driver Assistance System) functions including collision avoidance or impact mitigation of the own vehicle, follow traveling based on the inter-vehicle distance, vehicle speed maintaining traveling, collision warning of the own vehicle, lane departure traveling, and so forth. Also, for example, the automatic driving controlling unit 112 performs cooperative control for an aim of automatic traveling of autonomously driving without depending on operation of the driver, and so forth. The automatic driving controlling unit 112 includes a detection unit 131, a self-position estimation unit 132, a situation analysis unit 133, a planning unit 134, and a motion controlling unit 135.

The detection unit 131 performs detection of various types of information necessary for control of automatic driving. The detection unit 131 includes an outside-vehicle information detection unit 141, an in-vehicle information detection unit 142, and a vehicle state detection unit 143.

The outside-vehicle information detection unit 141 performs a detection process of information of the outside of the own vehicle on the basis of data or signals from the components of the vehicle controlling system 100. For example, the outside-vehicle information detection unit 141 performs a detection process, a recognition process, and a tracking process of an object around the own vehicle, and a detection process of the distance to the object. The objects that become a detection target include, for example, a vehicle, a person, an obstacle, a structure, a road, a traffic light, a traffic sign, a road sign, and so forth.

Further, the outside-vehicle information detection unit 141 performs, for example, a detection process of an environment around the own vehicle. Surrounding environments that become a detection target include, for example, the weather, air temperature, humidity, brightness, a state of the road, and so forth. The outside-vehicle information detection unit 141 supplies data indicative of a result of the detection process to the self-position estimation unit 132, a map analysis unit 151, a traffic rule recognition unit 152 and a situation recognition unit 153 of the situation analysis unit 133, an emergency avoidance unit 171 of the motion controlling unit 135, and so forth.

As the information to be acquired by the outside-vehicle information detection unit 141, information principally by the infrastructure can be received if the traveling section is a section in which the local dynamic map that is normally updated mainly as a section in which traveling by automatic driving is possible is supplied by the infrastructure, or the own vehicle may travel normally receiving update of the map from a vehicle or a vehicle group traveling in the corresponding section preceding to the own vehicle in advance before the own vehicle advances into a section. Further, in such a case that update with the latest local dynamic map from the infrastructure is not performed normally or in a like case, road environment information obtained from a leading vehicle which has already entered the section may be further utilized complementarily in order to obtain road information immediately before entering the section more safely especially by a line traveling or the like. Whether automatic driving is possible in the section depends upon whether or not advance information provided from the infrastructure is available. Provision of automatic driving traveling availability information on a route provided from the infrastructure is equivalent to provision of a so-called invisible track as information.

The in-vehicle information detection unit 142 performs a detection process of in-vehicle information on the basis of data or signals from the components of the vehicle controlling system 100. For example, the in-vehicle information detection unit 142 performs an authentication process and a recognition process of the driver, a detection process of a state of the driver, a detection process of a passenger, a detection process of an environment in the inside of the vehicle and so forth. The states of the driver that become a detection target include, for example, a physical condition, awakening, concentration, fatigue, a line-of-sight direction, and so forth.

Further, utilization of automatic driving in which the driver is withdrawn fully from a driving steering work is supposed in the future, and it becomes necessary for the system to grasp that the driver has had a temporary doze or has started some other work and how far the consciousness necessary for return to driving has returned. In short, although a driver monitoring system investigated heretofore has been directed principally to means for detecting lower consciousness such as sleepiness, since a state in which the driver does not at all intervene with driving steering is applicable in the future, the system becomes free from the means for observing the driving intervention degree of the driver, and it is necessary to observe the consciousness return transition necessary for driving from a state in which an accurate state of consciousness of the driver is unknown and, after accurate internal awakening of the driver is grasped, to proceed with transfer of intervention from automatic driving to manual driving.

Therefore, the in-vehicle information detection unit 142 has mainly two major roles, the first one of which is passive monitoring of the state of the driver during automatic driving and the second one of which is, after a request for return is issued from the system, to detect whether the ability of the driver such as peripheral recognition, perception, and determination as well as an operational capability of the steering equipment reaches a level at which manual driving is possible until a section for driving with caution is reached. As the control, failure self-diagnosis of the entire vehicle may be further performed such that, also in a case where degradation of the automatic driving function occurs due to some functional failure for automatic driving, early return to manual driving by the driver is encouraged similarly. The passive monitoring here signifies detection means of the type that does not require a conscious response reaction of the driver and does not exclude an article that originates a physical radio wave, light or the like from an apparatus and detects a response signal. In short, that a recognition response reaction is not under consciousness such as during a nap is referred to as a passive type.

The environment in the inside of the vehicle that is a detection target includes, for example, the temperature, humidity, brightness, smell, and so forth. The in-vehicle information detection unit 142 supplies data indicative of a result of the detection process to the situation recognition unit 153 of the situation analysis unit 133 and to the motion controlling unit 135. It is to be noted that, in a case where it is found that, after a driving return instruction to the driver by the system is issued, the driver cannot achieve manual driving in precise deadline time and, even if deceleration control is performed while self-driving is maintained to perform time-giving, it is determined that takeover cannot be performed in time, the in-vehicle information detection unit 142 issues an instruction to the emergency avoidance unit 171 or the like of the system to start a deceleration, escape and stopping procedure in order to escape the vehicle.

The vehicle state detection unit 143 performs a detection process of a state of the own vehicle on the basis of data or signals from the components of the vehicle controlling system 100. The states of the own vehicle that become a detection target include, for example, a speed, an acceleration, a steering angle, presence or absence and the details of abnormality, a state of a driving operation, a position and an inclination of the power seat, a locked state of a door, states of other in-vehicle apparatuses, and so forth. The vehicle state detection unit 143 supplies data indicative of a result of the detection process to the situation recognition unit 153 of the situation analysis unit 133, emergency avoidance unit 171 of the motion controlling unit 135, and so forth.

The self-position estimation unit 132 performs an estimation process of the position, posture, and so forth of the own vehicle on the basis of data or signals from the components of the vehicle controlling system 100, such as the outside-vehicle information detection unit 141, and the situation recognition unit 153 of the situation analysis unit 133. Further, the self-position estimation unit 132 generates a local map for use for estimation of the position of the own vehicle (hereinafter referred to as an own position estimation map) if necessary.

The own position estimation map is a high accuracy map using, for example, a technology of SLAM (Simulated Localization and Mapping). The self-position estimation unit 132 supplies data indicative of a result of the estimation process to the map analysis unit 151, the traffic rule recognition unit 152, the situation recognition unit 153, and so forth of the situation analysis unit 133. Further, the self-position estimation unit 132 stores the own position estimation map into the storage unit 111.

The situation analysis unit 133 performs an analysis process of the own vehicle and a surrounding situation. The situation analysis unit 133 includes the map analysis unit 151, the traffic rule recognition unit 152, the situation recognition unit 153, a situation prediction unit 154 and a learning unit 155.

The map analysis unit 151 performs an analysis process of various maps stored in the storage unit 111 while using data or signals from the components of the vehicle controlling system 100, such as the self-position estimation unit 132 and the outside-vehicle information detection unit 141 as occasion demands to construct a map including information necessary for processing of automatic driving. The map analysis unit 151 supplies the constructed map to the traffic rule recognition unit 152, the situation recognition unit 153, the situation prediction unit 154 and a route planning unit 161, an action planning unit 162 and a motion planning unit 163 of the planning unit 134.

The traffic rule recognition unit 152 performs a recognition process of traffic rules around the own vehicle on the basis of data or signals from the components of the vehicle controlling system 100, such as the self-position estimation unit 132, the outside-vehicle information detection unit 141, and the map analysis unit 151. By this recognition process, for example, the position and the state of a traffic light around the own vehicle, the details of a traffic regulation around the own vehicle, available lanes, and so forth are recognized. The traffic rule recognition unit 152 supplies data indicative of a result of the recognition process to the situation prediction unit 154 and so forth.

The situation recognition unit 153 performs a recognition process of a situation relating to the own vehicle on the basis of data or signals from the components of the vehicle controlling system 100, such as the self-position estimation unit 132, the outside-vehicle information detection unit 141, the in-vehicle information detection unit 142, and the vehicle state detection unit 143, and the map analysis unit 151. For example, the situation recognition unit 153 performs a recognition process of the situation of the own vehicle, situation around the own vehicle, situation of the driver of the own vehicle, and so forth. Further, the situation recognition unit 153 generates a local map to be used for recognition of the situation around the own vehicle (hereinafter referred to as a map for situation recognition) if necessary. The map for situation recognition is set as, for example, an occupancy grid map (Occupancy Grid Map).

The situations of the own vehicle that become a recognition target include, for example, conditions unique to the vehicle such as the position, posture and movement (for example, the speed, acceleration, moving direction and so forth) of the own vehicle, and the movement of the center of gravity of the vehicle body in association with a loaded cargo quantity that determines the motion characteristics of the own vehicle and loading of the cargo, a tire pressure, braking distance movement in association with brake braking pad wear situation, permissible maximum deceleration braking for prevention of movement of the cargo caused by braking due to loaded cargo, and a centrifugal relaxation limit speed arising from a liquid cargo at the time of traveling on a curve, and conditions unique to the loaded cargo, and since the timing required for control differs depending on the properties of the vehicle itself in a quite same road environment such as a coefficient of friction of a road surface, a road curve, or a gradient, and on a loaded article, and so forth, it is necessary to perform collection of such various conditions and learn them so as to be reflected upon an optimum timing at which the control is to be performed. It is not sufficient if the presence or absence and the details of abnormality and so forth of the own vehicle are simply observed and monitored.

The situations around the own vehicle that become a recognition target include, for example, the type and the position of a stationary object around the own vehicle, the type, position and movement (for example, the speed, acceleration, moving direction, and so forth) of a moving object therearound, the configuration of the road therearound and the state of the road surface as well as the weather, humidity, brightness, and so forth therearound. The states of the driver that become a recognition target include, for example, the physical condition, awakening level, concentration, fatigue, movement of the line of sight, driving operations, and so forth. For safe traveling of the vehicle, the control start point at which coping is demanded differs significantly depending upon a loaded amount loaded in the unique state of the vehicle, a chassis fixed state of the loading portion, a biased state of the center of gravity, a maximum possible-deceleration acceleration value, a maximum load possible centrifugal force, and a return response delay mount in response to the state of the driver.

The situation recognition unit 153 supplies data indicative of a result of the recognition process (including, as occasion demands, the map for situation recognition) to the self-position estimation unit 132, the situation prediction unit 154, and so forth. Further, the situation recognition unit 153 stores the map for situation recognition into the storage unit 111.

The situation prediction unit 154 performs a prediction process of a situation relating to the own vehicle on the basis of data or signals from the components of the vehicle controlling system 100 such as the map analysis unit 151, the traffic rule recognition unit 152, the situation recognition unit 153, and so forth. For example, the situation prediction unit 154 performs a prediction process of a situation of the own vehicle, a situation around the own vehicle, a situation of the driver and so forth.

The situations of the own vehicle that become a prediction target include, for example, a behavior of the own vehicle, occurrence of abnormality, a mileage, and so forth. The situations around the own vehicle that become a prediction target include, for example, a behavior of a moving object around the own vehicle, a change of the state of a traffic light, a change of the environment such as the weather, and so forth. The situations of the driver that become a prediction target include, for example, a behavior, a physical condition, and so forth of the driver.

The situation prediction unit 154 supplies data indicative of a result of the prediction process to the route planning unit 161, the action planning unit 162, the motion planning unit 163, and so forth of the planning unit 134 together with data from the traffic rule recognition unit 152 and the situation recognition unit 153.

The learning unit 155 learns an optimum return timing according to a return action pattern of the driver, a vehicle property and so forth and supplies learning information to the situation recognition unit 153 and so forth. Consequently, it is possible, for example, to present to the driver an optimum timing that is required for the driver to return from automatic driving to manual driving at a prescribed fixed ratio or more and is determined statistically.

The route planning unit 161 plans a route to a destination on the basis of data or signals from the components of the vehicle controlling system 100 such as the map analysis unit 151 and the situation prediction unit 154. For example, the route planning unit 161 sets a route from the current position to a designated destination on the basis of the global map. Further, for example, the route planning unit 161 suitably changes the route on the basis of a situation such as a traffic jam, an accident, a traffic rule, or a construction, the physical condition of the driver, and so forth. The route planning unit 161 supplies data indicative of the planned route to the action planning unit 162 and so forth.

The action planning unit 162 plans an action of the own vehicle for traveling safely in a planned period of time along the route planned by the route planning unit 161 on the basis of data or signals from the components of the vehicle controlling system 100 such as the map analysis unit 151 and the situation prediction unit 154. For example, the action planning unit 162 performs planning of start, stop, a moving direction (for example, forward, backward, turn left, turn right, turnaround, or the like), a traveling lane, a traveling speed, passing, and so forth. The action planning unit 162 supplies data indicative of the planned action of the own vehicle to the motion planning unit 163 and so forth.

The motion planning unit 163 plans a motion of the own vehicle for implementing the action planned by the action planning unit 162 on the basis of data or signals from the components of the vehicle controlling system 100 such as the map analysis unit 151 and the situation prediction unit 154. For example, the motion planning unit 163 performs planning of acceleration, deceleration, a traveling track, and so forth. The motion planning unit 163 supplies data indicative of the planned motion of the own vehicle to an acceleration/deceleration controlling unit 172, a direction controlling unit 173, and so forth of the motion controlling unit 135.

The motion controlling unit 135 performs control of motion of the own vehicle. The motion controlling unit 135 includes an emergency avoidance unit 171, an acceleration/deceleration controlling unit 172, and a direction controlling unit 173.

The emergency avoidance unit 171 performs a detection process of an emergency such as collision, contact, entering of a danger zone, abnormality of the driver or abnormality of the vehicle on the basis of results of detection of the outside-vehicle information detection unit 141, the in-vehicle information detection unit 142, and the vehicle state detection unit 143. In a case where the emergency avoidance unit 171 detects occurrence of an emergency, it plans a motion of the own vehicle for avoiding the emergency such as sudden stop, sharp turn, or the like. The emergency avoidance unit 171 supplies data indicative of the planed motion of the own vehicle to the acceleration/deceleration controlling unit 172, the direction controlling unit 173, and so forth.

The acceleration/deceleration controlling unit 172 performs acceleration/deceleration control for implementing the motion of the own vehicle planned by the motion planning unit 163 or the emergency avoidance unit 171. The acceleration/deceleration controlling unit 172 calculates a control target value of the driving force generation apparatus or the brake system for implementing the planned acceleration, deceleration or sudden stop and supplies a control instruction indicative of the calculated control target value to the drive-train system controlling unit 107. It is to be noted that an emergency possibly occurs principally in two cases. In particular, the two cases include a case in which an unexpected accident occurs due to a sudden reason during automatic driving on a road that is originally determined to be safe in a local dynamic map or the like acquired from the infrastructure in the traveling route during automatic driving and emergency return is not performed in time and another case in which the driver cannot return precisely from automatic driving to manual driving.

The direction controlling unit 173 performs direction control for implementing the motion of the own vehicle planned by the motion planning unit 163 or the emergency avoidance unit 171. For example, the direction controlling unit 173 calculates a control target value of the steering mechanism for implementing a traveling track or sharp turnaround planned by the motion planning unit 163 or the emergency avoidance unit 171 and supplies a control instruction indicative of the calculated control target value to the drive-train system controlling unit 107.

[Manual Takeover Sequence of Automatic Driving]

Figure 3:
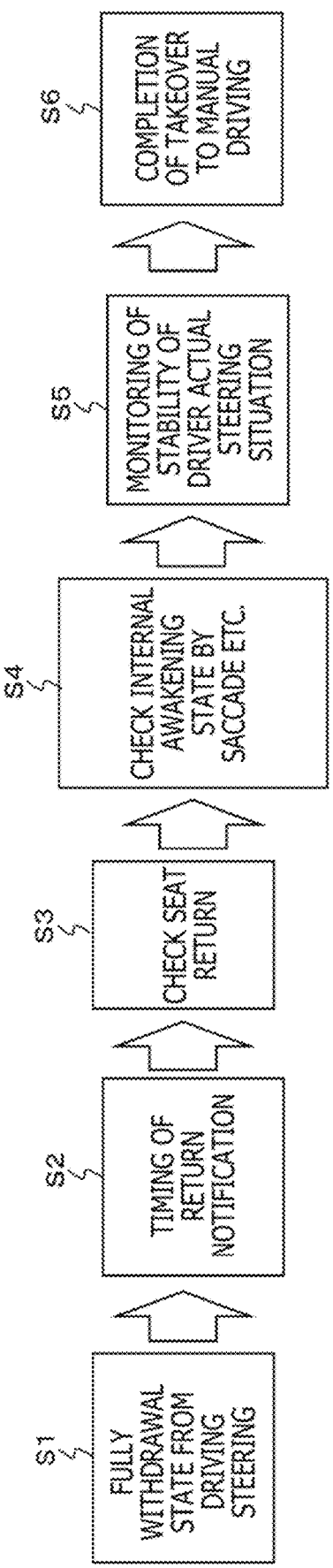
FIG. 3 is a view schematically depicting an example of a manual takeover sequence of automatic driving by an automatic driving controlling unit.

FIG. 3 schematically depicts an example of a manual takeover sequence of automatic driving by the automatic driving controlling unit 112. At step S1, the driver is possibly in a state fully withdrawn from driving steering in the future. In this state, the driver can, for example, take a nap, watch a video, focus on a game, or execute a secondary task such as a work using a visual tool such as a tablet or a smartphone. Also, it can be considered that the work in which a visual tool such as a tablet or a smartphone is used is performed, for example, in a state in which the driver's seat is displaced or on a seat different from the driver's seat.

Depending on the states of the driver, it is supposed that, when the own vehicle approaches a section in which manual driving return is demanded on the route, the period of time until the driver returns varies significantly depending upon the contents of the current work each time, and in a case where the period of time is insufficient with a notification immediately before the approach of the event or the notification is issued exceedingly early with a margin taken to the approach of the event, such a situation occurs that the time till a timing at which return is actually required is excessively long. As a result, if such a situation that a notification is not issued at a precise timing occurs repeatedly, then the driver will lose the reliability on the timing in regard to the notification timing of the system, and the consciousness of the driver in regard to the notification degrades and the driver will neglect precise measures. This results in increase of the risk that takeover is not performed well and makes an inhibiting factor of relieved secondary task execution. Therefore, in order for the driver to start measures for precise driving return to the notification, it is necessary for the system to perform optimization of the notification timing.

At step S2, the timing for return notification comes and a notification for driving return is issued visually or auditorily to the driver. The automatic driving controlling unit 112 monitors, for example, a steady state of the driver and grasps a timing for issuing a notification, and a notification is issued at a suitable timing. In particular, during a passive monitoring period at the preceding stage, the execution state of a secondary task by the driver is normally monitored passively and an optimum timing for the notification can be calculated by the system. The passive monitoring during the period at step S1 is normally and continuously performed, and the optimum return timing and the return notification method are desirably performed in accordance with the unique return characteristic of the driver.

In particular, it is desirable to present, to the driver, an optimum timing determined statistically and required to allow the driver to return from automatic driving to manual driving correctly at a rate equal to or higher than a prescribed rate by learning an optimum return timing according to a return action timing of the driver, a vehicle characteristic, and so forth. In this case, in a case where the driver does not respond to the notification within a fixed period of time, a warning by alarming sound is issued.

At step S3, it is checked whether or not the driver returns to be seated on the driver's seat. At step S4, an internal awakening state of the driver is checked by a saccade or the like. At step S5, the stability of an actual steering situation of the driver is monitored. Then at step S6, takeover from automatic driving to manual driving is completed.

Figure 4:
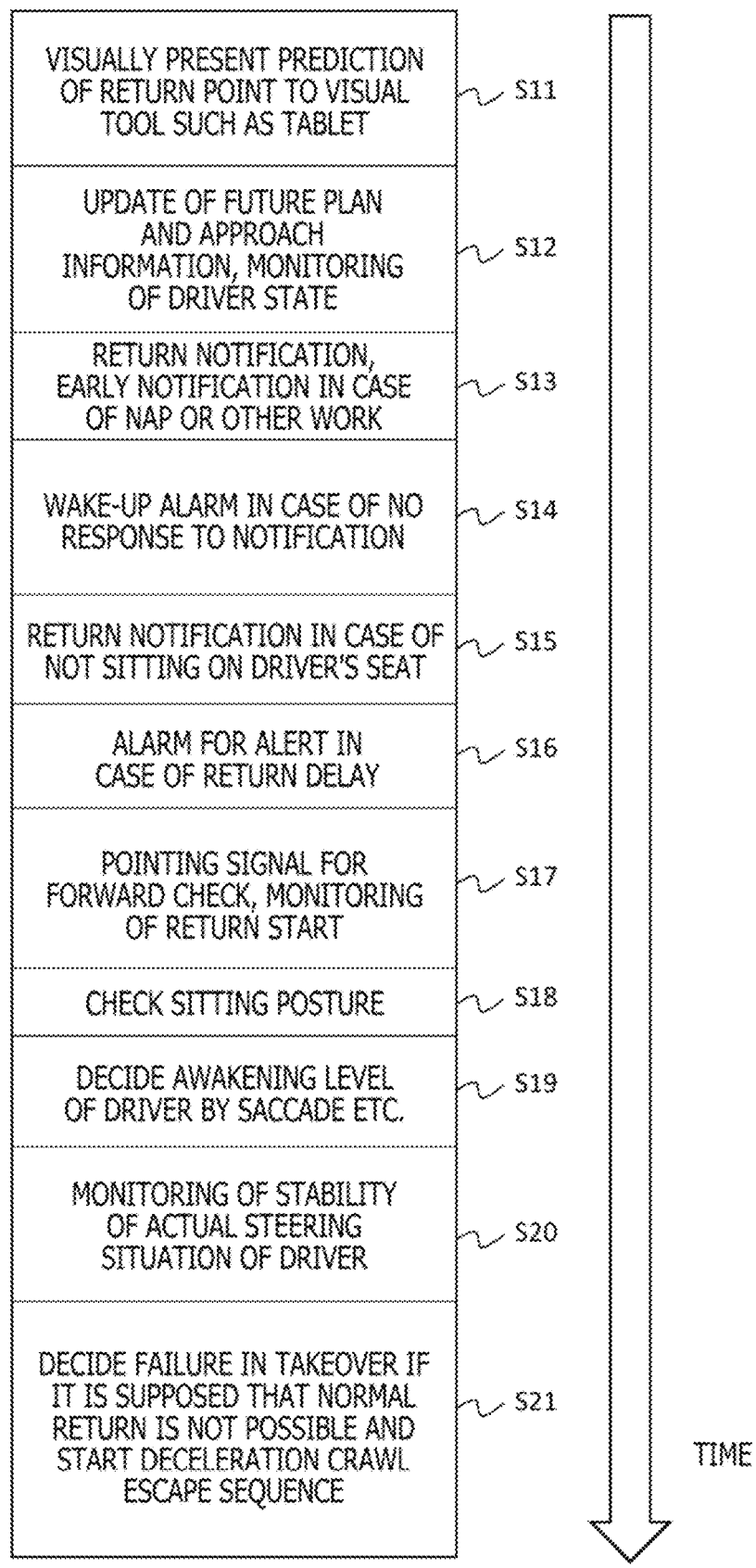
FIG. 4 is a view depicting a more detailed example of the manual takeover sequence of automatic driving.

FIG. 4 depicts a more detailed example of the manual takeover sequence of automatic driving. At step S11, prediction of a return point is visually presented to a visual tool such as a tablet or a smartphone. However, there is no necessity to restrict the display to the visual tool, but a display mode is desirable in which the visual presentation is included in the field of view of the driver who has been withdrawn from driving during execution of a secondary task such as, for example, the center information display of the vehicle. Although details are hereinafter described, presentation of a future plan and approach information is performed, and the return point is displayed such that it approaches the own vehicle as time passes.

At step S12, the presentation contents of the future plan and the approach information are suitably changed by update of the LDM (Local Dynamic Map) or the like. Further, at step S12, the state of the driver is periodically monitored. At step S13, the return point coming in a fixed period of time from the current point is emphatically displayed to the driver by flickering display, wave display, or the like to notify the driver. The timing at which the notification is to be issued at step S13 is adjusted such that return is performed in time by executing this notification early in response to a result of the detection periodically monitored at the preceding stage, namely, in response to the depth of withdrawal of the driver from driving by nap or by a secondary task.

At step S14, if the driver does not react with the notification, then an alarm for wakeup is sounded. At step S15, if the driver does not sit on the driver's seat, then, a visual or auditory notification for return is issued to the driver. At step S16, in a case where there is a return delay for sitting, an alarm for alert is sounded. At step S17, for example, a pointing signal for forward confirmation by the driver is monitored as return start.

At step S18, a sitting posture is checked. At step S19, the internal awakening level of the driver by such a perceptual reflex as circade, fixation, or the like is decided in order to detect recovery of an internal perception state in the brain of the driver using such means, for example, as detailed analysis of a line of sight. At step S20, the driving steering authority is sequentially entrusted to the driver, and while observing a response steering situation of the actual steering reaction, the steering is entrusted, and the steering stability is monitored.

In a case where the result of the monitoring observation of the stability indicates that subjective driving steering return is not detected to such a degree as is anticipated to the driver, this signifies that there is a risk that the driver still is in an extended dreaming state. Therefore, if it is assumed at step S21 that normal return is impossible, then it is determined that emergency takeover results in failure, and a deceleration crawl escape sequence is started.

Since the temporal transition required for such return changes depending upon various factors such as an age or experience, fatigue, and so forth of the driver, it is determined by a return timing according to the individual. In a case where the driver is requested to return from automatic driving to manual driving, at least a fixed period of time is required until the driver can return to manual driving almost with certainty. A configuration that performs optimum timing notification according to vehicle characteristics, road characteristics, and a driving return characteristic of an individual is most desirable, and since an approach situation of a takeover point is displayed in an interlocking relationship, the driver can obtain the convenience that the driver can utilize a secondary task at ease in response to a permission situation and simultaneously, since one of nervous and relaxed states appears alternately, cautious return of the user is implemented suitably for every necessary section, ergonomically leading to utilization. In other words, the driver is released from an unnecessary continuous cautious tension state.

A maximum effect of this procedure resides in that the balance of a secondary task in tension and relaxation states of the user can be kept. As a result, such a risk that, as a result of sustained tension, the user is tired in nerve and, as a result, the user transits to a distracted state because of drowsiness from the middle can be reduced, and there is an effect in long-term sustainable operation. It is to be noted that, in order to maximize the effect, even in a section in which driver intervention is not required for a long distance, in a case where tension return of the driver is desirable in the middle, a dummy event may be generated in the middle such that return level evaluation of the driver and aptitude response evaluation of the driver are performed in response to the return degree of the dummy event by the driver and recording storage of the return degree evaluation values may be performed further.

[Overview of Motion of Automatic Driving Target Vehicle]

Figure 5:
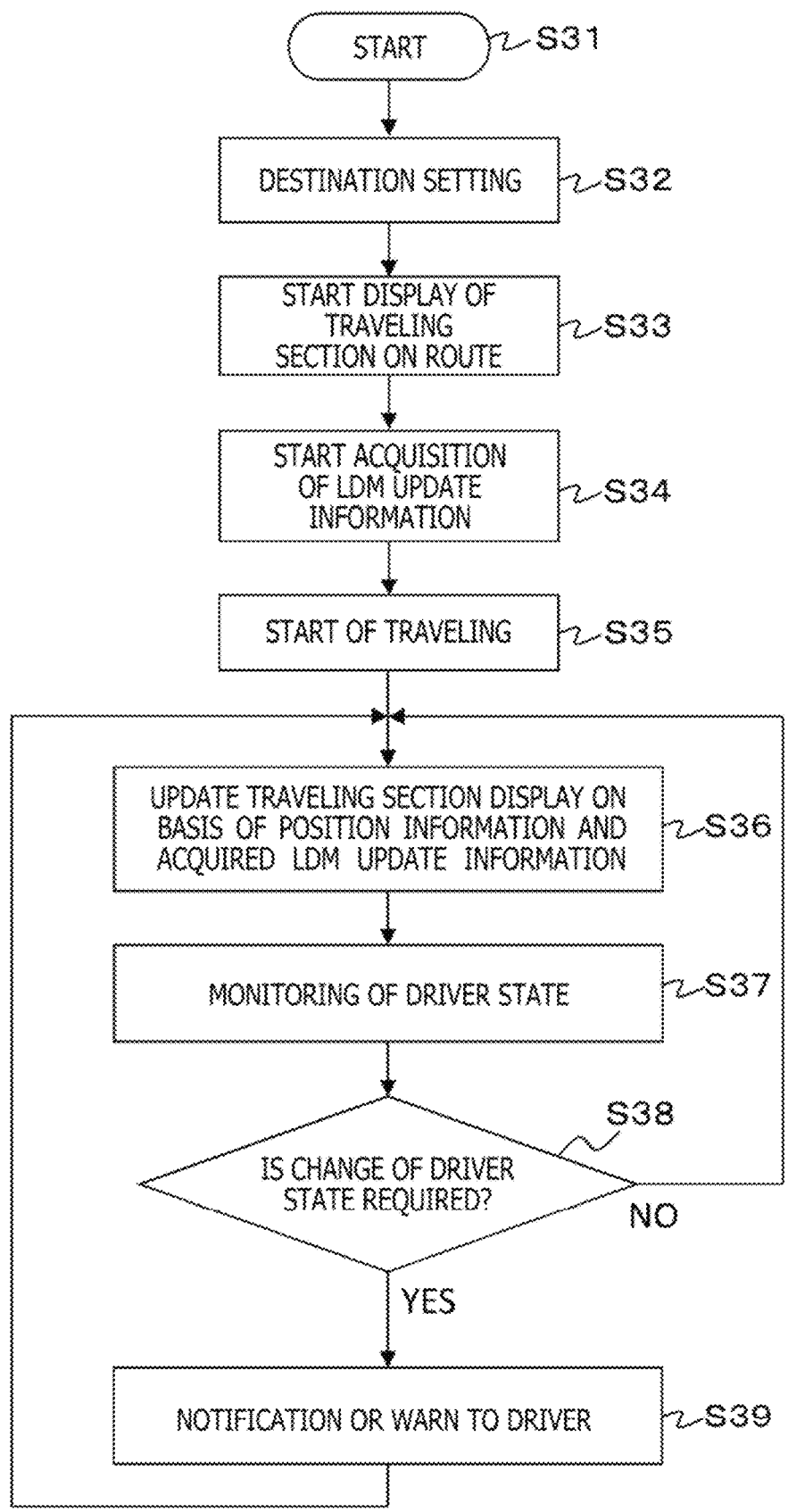
FIG. 5 is a flow chart depicting an overview of operation of an automatic driving target vehicle including the vehicle controlling system.

A flow chart of FIG. 5 depicts an overview of motion of an automatic driving target vehicle that includes the vehicle controlling system 100 described hereinabove. At step S31, motion is started. Then, at step S32, the inputting unit 101 will be operated by the driver to set a destination. In this case, an inputting operation of the driver is performed on the basis of a display image on the instrument panel.

It is to be noted that, although an example of a case in which a user gets on the vehicle to suppose itinerary setting is described as the present embodiment, the user may perform remote advance reservation setting from a smartphone in advance before the user gets on the vehicle or from a personal computer before the user goes out of the own home. Further, the system of the vehicle may perform preplanning setting in accordance with a schedule assumed by the driver in accordance with a schedule table and may update or acquire LDM information regarding a road environment to display actual traveling advice like a concierge upon or before getting on the vehicle.

Then at step S33, traveling section display on the traveling route is started. This traveling section display is displayed on the instrument panel or is displayed on a tablet or the like, on which the driver performs a secondary task, in a lined up relationship with a work window. Consequently, the driver who is performing a work on the work window can easily recognize a driver intervention requiring section and an automatic driving available section of the traveling route on a reach prediction time axis from the current point.

In this traveling section display, presentation of the future plan and approach information to individual points is performed. In this traveling section display, the driver intervention requiring section and the automatic driving available section of the traveling route are displayed on the reach prediction time axis from the current point. Then, the driver intervention requiring section includes a manual driving section, a takeover section from automatic driving to manual driving, and a cautious traveling section from automatic driving. Details of the traveling section display are hereinafter described.

Then at step S34, acquisition of LDM update information is started. Together with the acquisition of LDM update information, it becomes possible to change the contents of the traveling section display to the latest state. Then at step S35, traveling is started. Then at step ST36, display of the traveling section display is updated on the basis of the position information of the own vehicle and the acquired LDM update information. Consequently, the traveling section display is scroll displayed such that each section approaches the own vehicle as the vehicle travels.

Then at step S37, monitoring of the driver state is performed. Then at step S38, it is decided whether it is necessary to change the driver state. For example, in a case where a driver intervention requiring section approaches in a state in which the own vehicle currently is in an automatic driving available section and the driver is in a fully withdrawn state from traveling steering, it is necessary to cause the driver to return to a traveling steering state early.

When there is no necessity to change the driver state, the processing returns to the operation at step S36. Conversely, when it is necessary to change the driver state, a notification of this is issued to the driver at step S39. If the driver does not respond to the notification, then a warning (alarm) is generated. If the driver reacts with the notification or the warning, then the processing returns to the operation at step S36.

It is to be noted that, though not represented in the flow chart of FIG. 5, for example, in a case where it is estimated, at a stage at which a driver intervention requiring section is approaching, that it is impossible for the driver to return to a driving steering state in a set grace scheduled time period, for example, a deceleration crawl escape sequence is started, and arriving time at a takeover point is delayed to generate time grace. Then, when return cannot be expected even with this, the vehicle further travels emergently escaping to a shoulder of the road or an evacuation spot and is stopped. In regard to whether arrival at a takeover point is to be delayed by deceleration crawl, since a desirable state is caused by various factors such as an infrastructure factor such as whether a permissible traffic congestion impact to or presence or absence of an escape place for the road or a traffic amount at the applicable point of time, dealing according to optimum control by road-vehicle cooperation is desirable. However, since the present specification focuses on a display form, detailed description is not given of vehicle control having an influence upon setting on the time axis.

[Details of Traveling Section Display]

Figure 6:
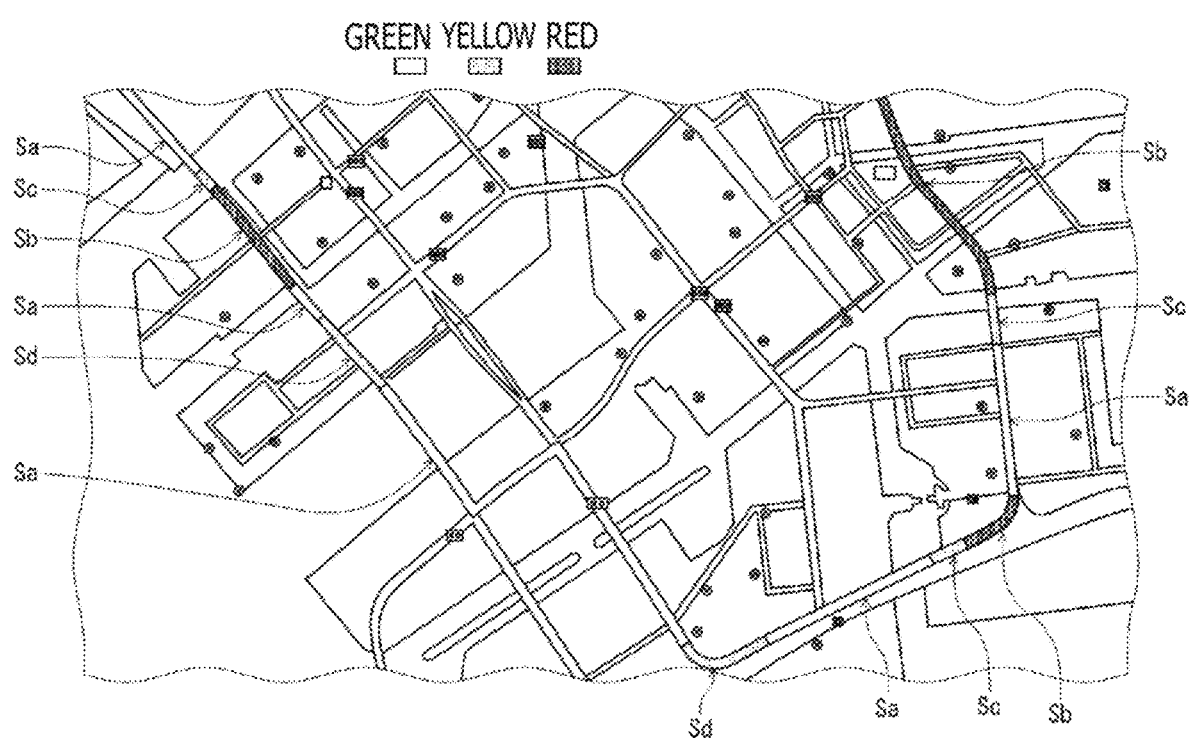
FIG. 6 is a view depicting an example of a traveling route in which automatic driving availability sections determined by setting of a destination by a driver are set in a mixed state or appear.

FIG. 6 depicts an example of a traveling route determined through setting of a destination by a driver. The traveling route includes an automatic driving available section Sa, a manual driving section Sb, a takeover section Sc from automatic driving to manual driving and a cautious traveling section Sd from automatic driving. Here, the takeover section Sc exists immediately before the manual driving section Sb without fail, and it is necessary for the driver to be in a return posture to manual driving. Further, the cautious traveling section Sd is a section in which the vehicle can decelerate and travel with automatic driving maintained under careful watching of the driver who is in a return posture to manual driving.

In the example depicted, the automatic driving available section Sa is indicated in green; the manual driving section Sb is indicated in red; and the takeover section Sc and the cautious traveling section Sd are indicated in yellow. It is to be noted that, for the convenience of illustration, the colors are represented in different patterns.

In traveling section display on a display device such as the center information display or a tablet, such sections of the traveling route as described above are represented on the reach prediction time axis from the current point. The automatic driving controlling unit 112 performs information processing for the traveling section display along the traveling route on the basis of the traveling route information and traffic information.

FIG. 7(a) represents individual sections of a traveling route in a fixed scale on the moving distance axis from the current point. FIG. 7(b) represents the flow speed v(t) in average road traffic at individual points. FIG. 7(c) represents the sections converted to those on the time axis using the speed v(t) from those represented on the moving distance axis. Consequently, the sections of the traveling route are presented on the reach prediction time axis from the current point. In short, a physical distance on the traveling route can be represented on a time axis by dividing the same by an average speed for each section.

In this embodiment, all sections displayed as traveling sections are divided into three sections as depicted in FIG. 7(d), and the time axis is changed among the sections. In particular, the first section from the current point to a first point (time t0, for example, approximately 10 minutes) is displayed as a time linear display nearest section on a first time axis. For example, time t0 is set to time necessary and sufficient before a general driver ends a secondary task and returns to driving. Since the nearest section approaching by traveling has a visual intuition effect equivalent to that when it is indicated on a map on which the vehicle proceeds at a fixed speed, the driver can start precise preparations for driving return arising from event approach, and there is a merit that the driver can intuitively and somewhat accurately grasp a point at which return is to be started. In short, the display purpose of the sections resides in provision of start determination information of a precise return point of a driver to a user.

Meanwhile, the second section from the first point (time t0) to the second point (time t1, for example, approximately one hour) is displayed as a time reciprocal display section on a time axis that sequentially changes from the first time axis to a second time axis that is reduced at a predetermined ratio from the first time axis. The display purpose of the second section is a scheme for providing a road situation for a longer period accurately to the driver with a narrow display because, when the second section is displayed in a scale factor equal to that principally in the preceding first section, it becomes difficult to display the long period in a narrow display space. By the scheme, the driver can easily grasp up to which point the driver may not be requested to intervene with the driving in a certain fixed section ahead together with traveling, and there is a merit that the driver can perform engagement in a secondary task systematically. Necessity/unnecessity of driving intervention becomes clear to the driver, and in a secondary task involved in communication with a third party or the like, a significant role of information presentation is played in release planning of the driver from the secondary task or the like.

Here, a setting method of this second display section is described with reference to FIG. 7(d). When the height of a triangle is represented by h0, time t at the point earlier by h from the top of the triangle is calculated by the following expression (1).

$$t = t0 * h0/h \qquad (1)$$

Meanwhile, the second time axis at the second point (time t1) is reduced at a ratio of hs/h0 from the first time axis. For example, in a case where hs=h0/8, the reduction ratio is 1/8.

The display in the second display section described above is, in a case where the vehicle is traveling at a fixed vehicle speed, equivalent to display where a traveling straight extension display section on the map is inclined obliquely to the moving direction or to a state in which the front of the road plane is viewed obliquely. In other words, since the visual effect of this display section is that the perspective can be understood intuitively from the display picture height position, even if graduations or the like for accurate position display are not displayed on the screen, the sensory distance can be grasped easily. Then, although a remote section is reduced, since this is not a point at which the vehicle arrives quickly by traveling, although rough prediction is important, the driver need not intuitively grasp such accurate reach time information as that at a near point. Therefore, this is preferable also when the driver schedules secondary task execution.

Further, the third section from the second point (time t1) to the third point (time t3) is displayed on the second time axis (reduction ratio hs/h0) as a time linear display remote section. By displaying the three sections divided in this manner, the driver can know details of section information nearest in time with a limited display space and can know section information more remote in time. It is to be noted that, when a remote portion is displayed with the display form for the second section maintained, this becomes lower than the human visual resolution and further becomes lower than the display resolution limit of the system. Therefore, it becomes impossible to discriminate information necessary for plan determination of a secondary task, and the significance of the display function is lost. Therefore, it is the most effective display that reduction of the display scale is ended at a stage at which a time section sense can be sufficiently grasped intuitively and classification of a necessary intervention section and an unnecessary section is displayed appropriately and, in the following sections, display with a scale returned to the fixed scale is performed.

It is to be noted that the vehicle controlling system 100 has default values for time t0, t1 and t3. Since also it is considerable that the values of time t0, t1 and t2 are made different between long distance driving and short distance driving, the default values are not limited to one set, and a plurality of sets may be provided such that the driver (user) or the system selectively uses them in response to a traveling route. Also, it is considerable to allow the driver (user) to arbitrarily set the values of time t0, t1 and t3.

Figure 8:
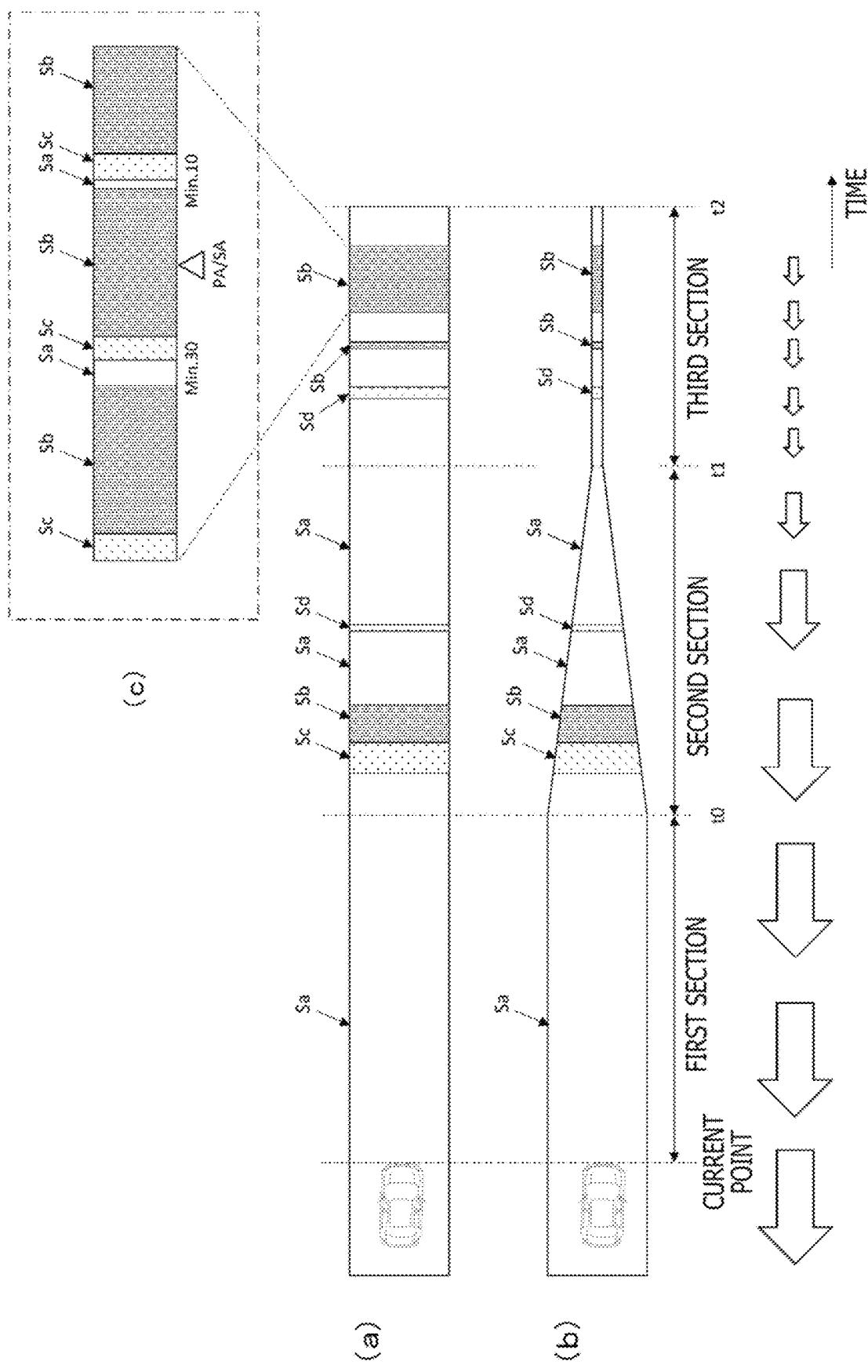
FIG. 8 depicts views each illustrating an example of a traveling section display image that is displayed finally.
Figure 9:
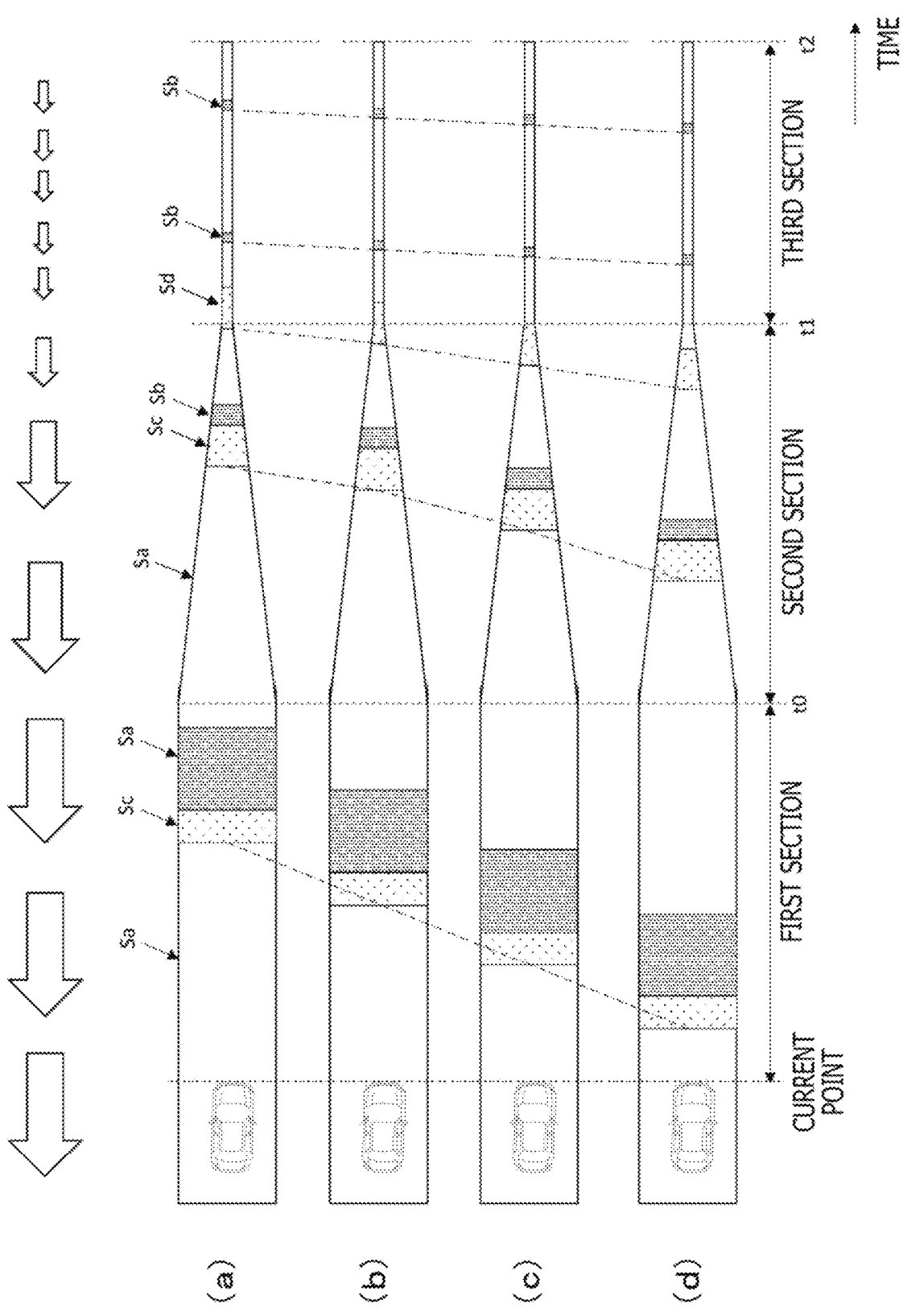
FIG. 9 depicts views each illustrating an example of change (example of scroll) of a traveling section display image as time passes.

FIGS. 8(a) and 8(b) each depict an example of a traveling section display image that is displayed finally. It is to be noted that, by the length of an arrow mark, whether the time axis is linear and further, a change of the reduction ratio of the time axis are depicted. In the case of FIG. 8(a), all of the sections of the first, second and third sections are displayed with a first width maintained.

Figure 7:
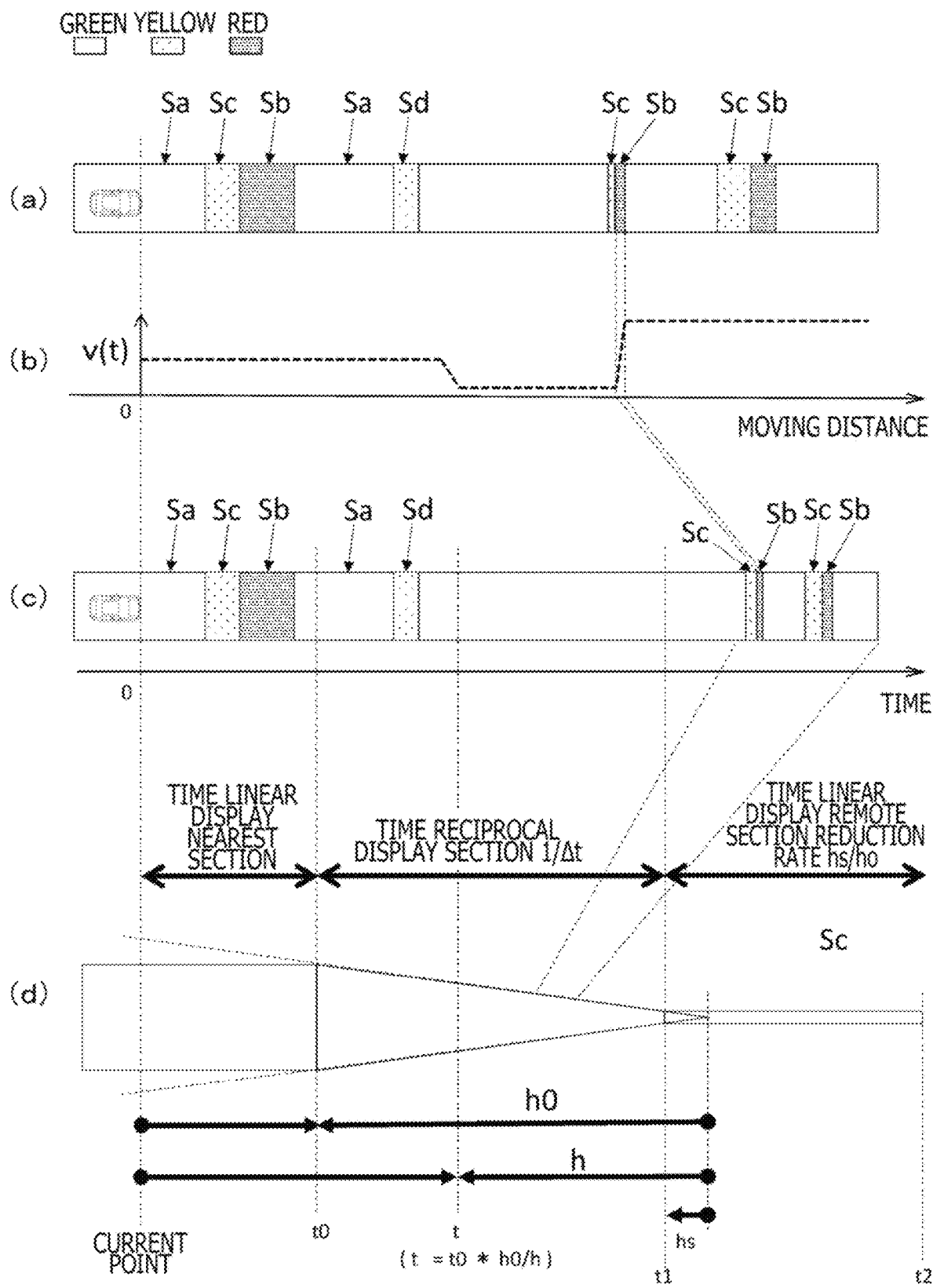
FIG. 7 depicts views each illustrating information processing for a traveling section display image along the traveling route.

On the other hand, in the case of FIG. 8(b), the first section from the current point to the first point (time t0) is displayed with a first width; the second section from the first point (time t0) to the second point (time t1) is displayed with a width sequentially changing from the first value to a second value that indicates a width narrower than the first width; and the third section from the second point (time T1) to the third point (time T2) is displayed with the second width. Consequently, the driver can visually recognize the degree of reduction of the time axis in the second and third sections with respect to the first section. In short, although the display form in FIG. 7 is a display image in which only the reduction ratio in the moving direction is taken into consideration, by further changing the transverse width with respect to the moving direction of the display information artificially in accordance with the perspective, a perspective effect same as that obtained when the driver views toward the infinite direction along the progress of a road or the map is obtained, and intuitive grasping of a distribution of driving intervention requiring sections is facilitated in comparison with that when the screen is viewed at a moment. Especially, in a case where only the second section is turned in the counterclockwise direction and viewed, since the second section is comparable with the road width of the road ahead and the arriving time at each applicable point in a case where the vehicle travels at a fixed speed, even if an accurate position graduation is not determined by observation, the reaching feeling to each point can be grasped intuitively, and the display form is considered to allow for time distribution.

It is to be noted that, when, at a portion at which the reduction rate hs/h0 is low, for example, like the third section, a section of a short time length is displayed with the time length as it is, then the section is displayed very thin, and it is expected that recognition of the driver is difficult. Therefore, even in a case where a driver intervention section (manual driving section, takeover section, cautious traveling section) is actually equal to or shorter than a fixed time length, it is displayed with a fixed time length. In this case, for example, in a case where a takeover section and a manual driving section continue, the display of the takeover section is sometimes omitted. In FIGS. 8(a) and 8(b), the display of the first manual driving section Sb in the third section indicates such a state as just described. Consequently, in the third section whose time axis is reduced significantly, the driver intervention requiring section of a short time length can be displayed such that it can be recognized by the driver.

Further, at a portion at which the reduction rate hs/h0 is low like the third section, in a case where a manual driving section Sb intermittently appears in a short cycle, this is displayed as a manual driving section Sb the entirety of which is continuous. In FIGS. 8(a) and 8(b), the display of the second manual driving section Sb in the third section indicates such a state that it is displayed in such a continuous manner as just described. The manual driving section Sb displayed in this manner actually includes, as depicted in FIG. 8(c), a cautious traveling section Sd and an automatic driving available section Sa of a short period in addition to the manual driving section Sb. It is to be noted that, as hereinafter described, detailed display can be performed if, in a state in which traveling section display is given on a tablet or the like, the point is, for example, double-touched.

The traveling section display on the traveling route described above is successively updated on the basis of position information of the own vehicle and acquired LDM update information. Consequently, as time passes, the traveling section display is scroll displayed such that the sections successively approach the own vehicle. FIGS. 9(a) to 9(d) each depict an example of change of traveling section display together with passage of time. Although this example depicts an example in which the second section is displayed in a tapering fashion, a case in which all sections are displayed with an equal width is also similar.

In this case, in the first section, the movement in each section is high. Meanwhile, in the second section, since the reduction of the time axis decreases from the third section side toward the first section side, the movement in each section becomes fast. Further, in the third section, since the reduction of the time axis becomes great, the movement in each section is slow.

Figure 10:
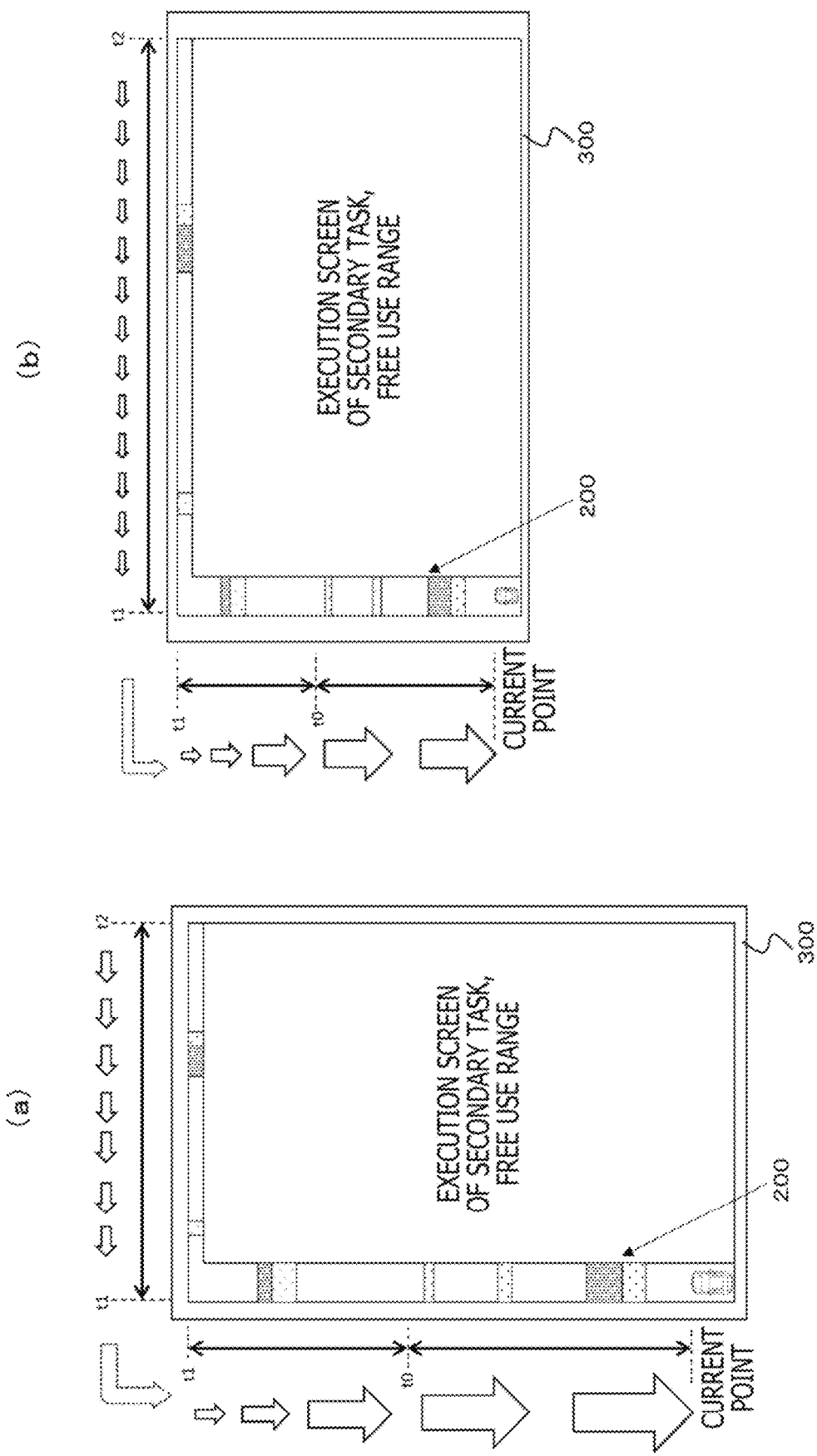
FIG. 10 depicts views each illustrating an example of a traveling section display image along a traveling route displayed on a screen of a tablet terminal apparatus (hereinafter referred to merely as a "tablet").

FIGS. 10(a) and 10(b) each depict an example of a traveling section display image 200 on a traveling route displayed on the screen of a tablet 300. FIG. 10(a) depicts an example in a case where the tablet 300 is used vertically. In this case, the vehicle controlling system 100 is displayed in a bent state along the left side and the upper side and is displayed in parallel to a work window that is an execution screen for a secondary task performed on the tablet 300. FIG. 10(*b*) depicts an example in a case where the tablet 300 is used in landscape. Also in this case, the traveling section display image 200 is displayed in a bent state along the left side and the upper side and is displayed in parallel to a work window that is an execution screen for a secondary task performed on the tablet 300. It is to be noted that, although, in the example depicted, the traveling section display image 200 is arranged in a bent state on the screen of the tablet 300, in a case where a sufficient arrangement space can be assured, also it can be considered that the traveling section display image 200 is arranged linearly.

Figure 11:
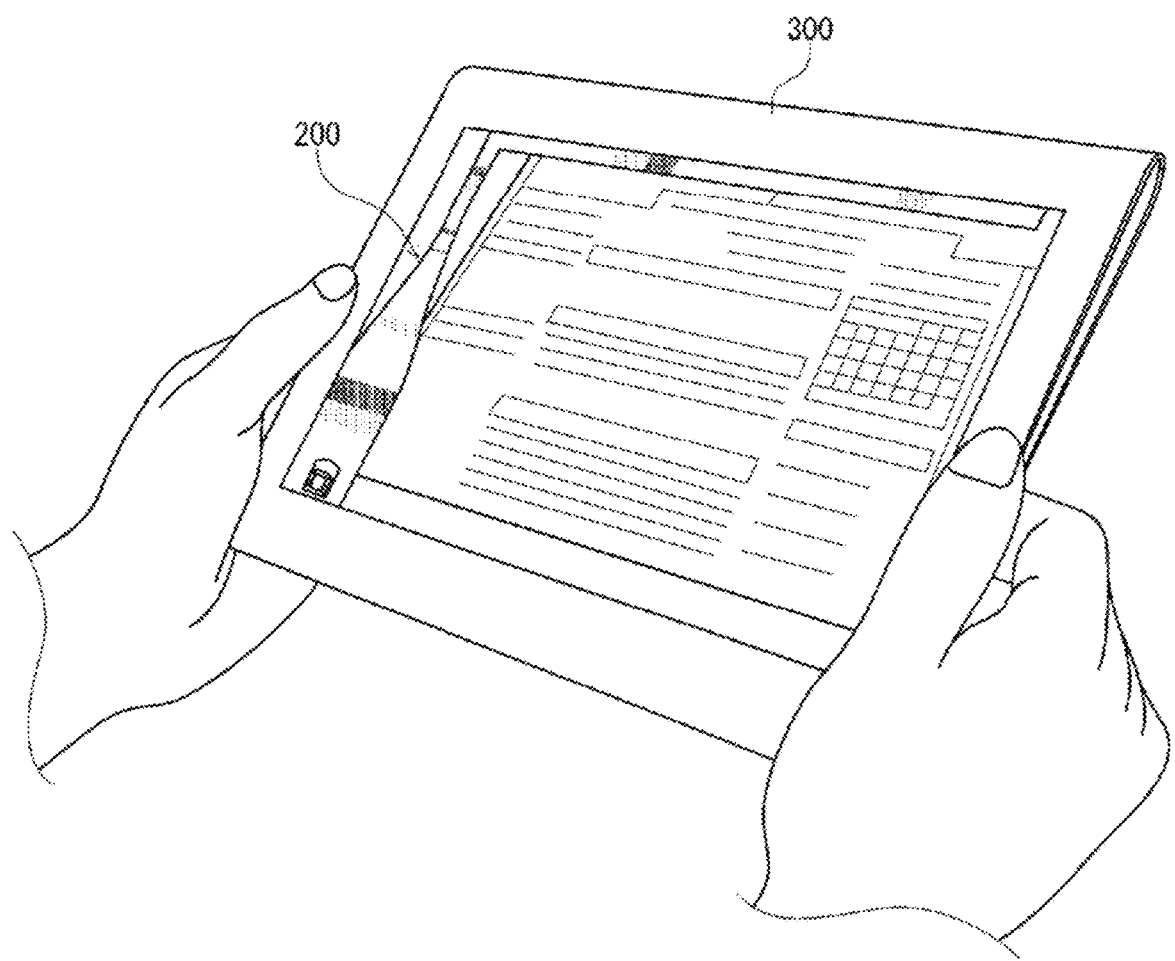
FIG. 11 is a view depicting an example of a state in which a driver is executing a secondary task actually using a tablet.

FIG. 11 depicts an example of a state in which the driver executes a secondary task actually using the tablet 300. In this example, the tablet 300 is used in landscape. On the screen of the tablet 300, a traveling section display image 200 is displayed in a state in which it is bent along the left side and the upper side. It is to be noted that whether or not the traveling section display image 200 is to be displayed on the screen may be selectively performed by an operation of the driver (user). In this case, for example, in a case where the traveling section display image 200 is displayed on the screen, in a case where a driver intervention requiring section comes in a fixed period of time and this is to be notified to the driver, then the traveling section display image 200 may be displayed on the screen automatically.

In a case where, in a state in which the traveling section display image 200 is displayed on the screen of the tablet 300, a driver intervention requiring section appears newly within the display section, a display image of the driver intervention requiring section generated newly appears newly. In this case, the newly appearing driver intervention requiring section is displayed, for example, by flickering display for a fixed period of time so as to be identifiable from the other display image. This flickering display may be accompanied by caution alarm sound. Here, a case where a driver intervention requiring section appears newly includes not only a case where a cautious traveling section or a manual driving section nearly appears but also a case in which the traveling section changes from a cautious traveling section to a manual driving section.

Figure 12:
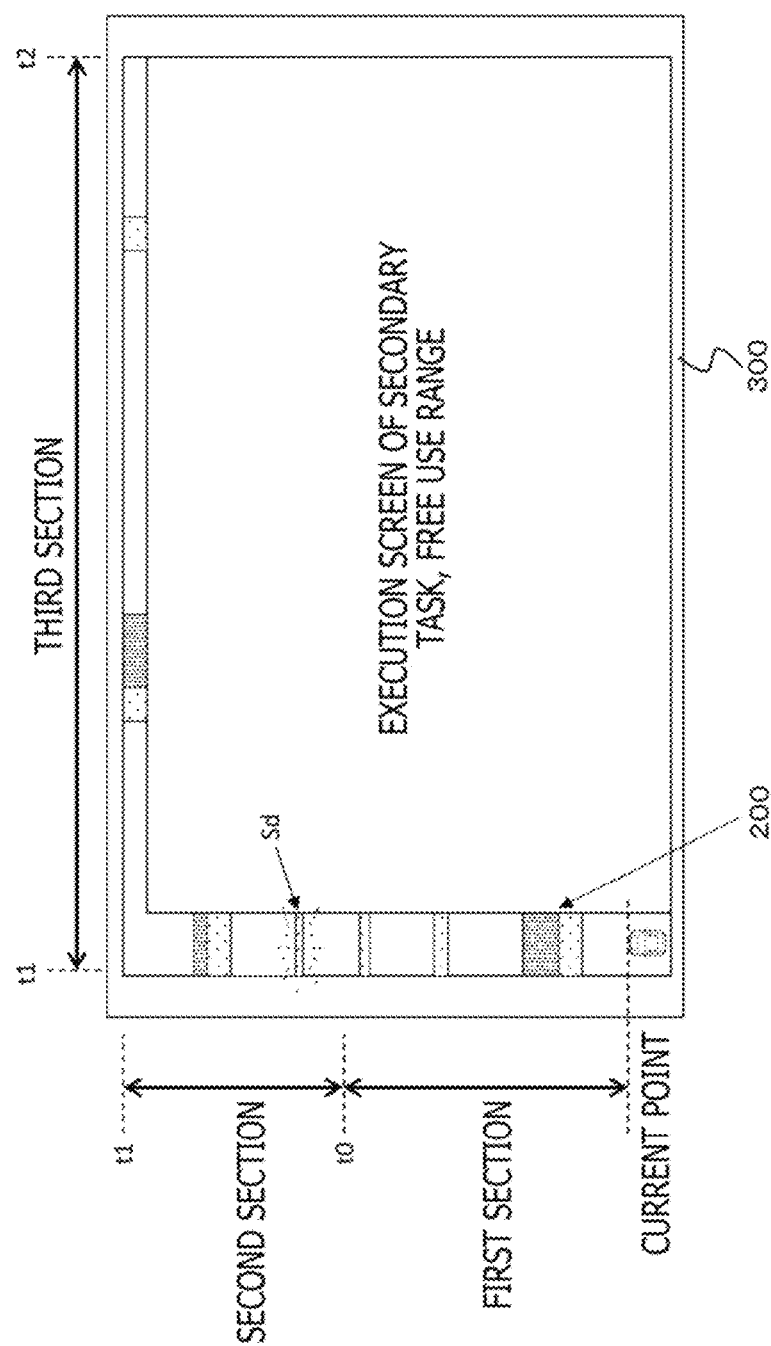
FIG. 12 is a view depicting an example in which a cautious traveling section Sd appears newly in a second section and a warning of this is given to a driver in a flickering display.

FIG. 12 depicts a state in which a cautious traveling section Sd appears newly in the second section and this is warned to the driver by flickering display. It is to be noted that, in this case, it may be made possible to stop the flickering display, namely, the warning state, by the driver touching the display location of the cautious traveling section Sd in the flicking display state. As an alternative, it may be made possible to popup display a small window by the driver touching the display location of the cautious traveling section Sd in the flicking display state and then stop the flickering, namely, the warning state, by the screen touch of the driver for approval.

Figure 13:
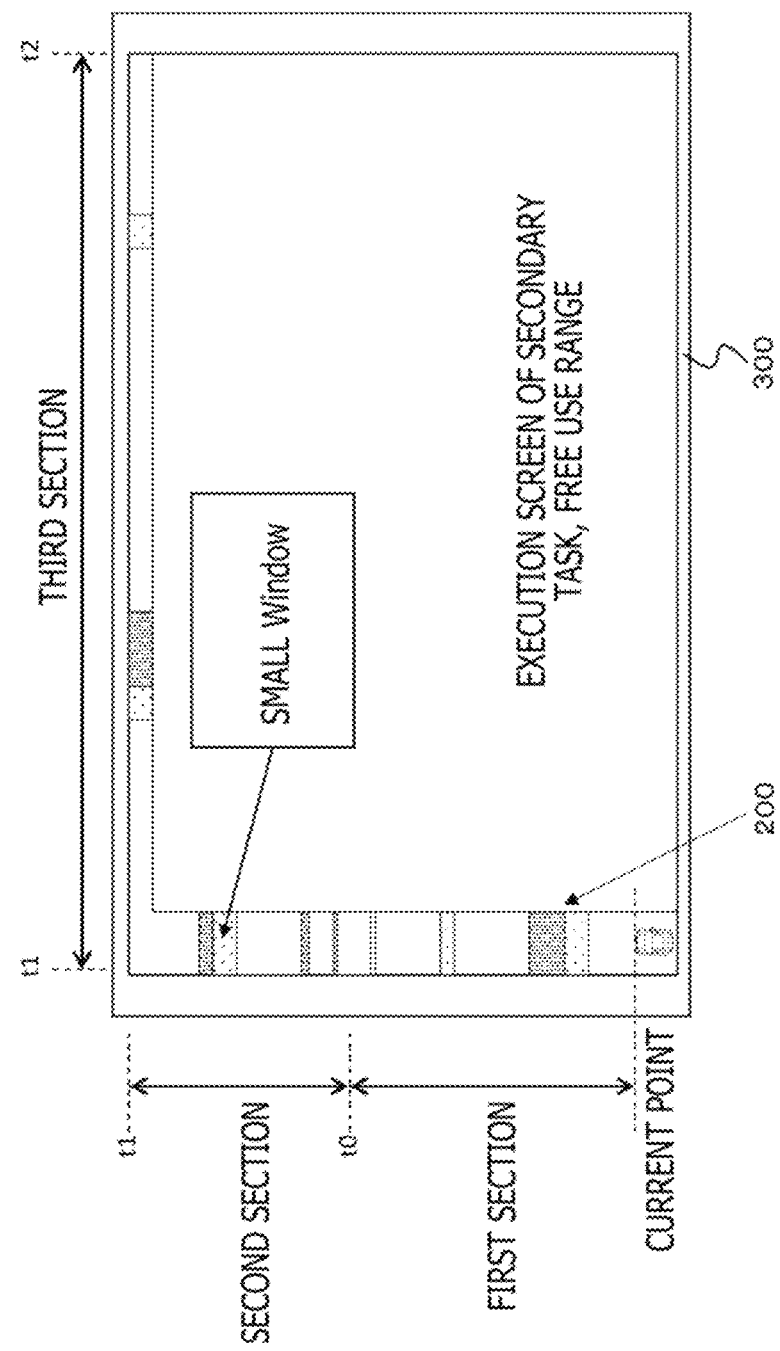
FIG. 13 is a view depicting a state in which a small window is pop-up displayed on a screen of a tablet.

Further, in a case where, in the state in which the traveling section display image 200 is displayed on the screen of the tablet 300, the driver (user) double-touches to designate an arbitrary point, for example, a small window is popup displayed, and display associated with the point is performed as depicted in FIG. 13.

Figure 14:
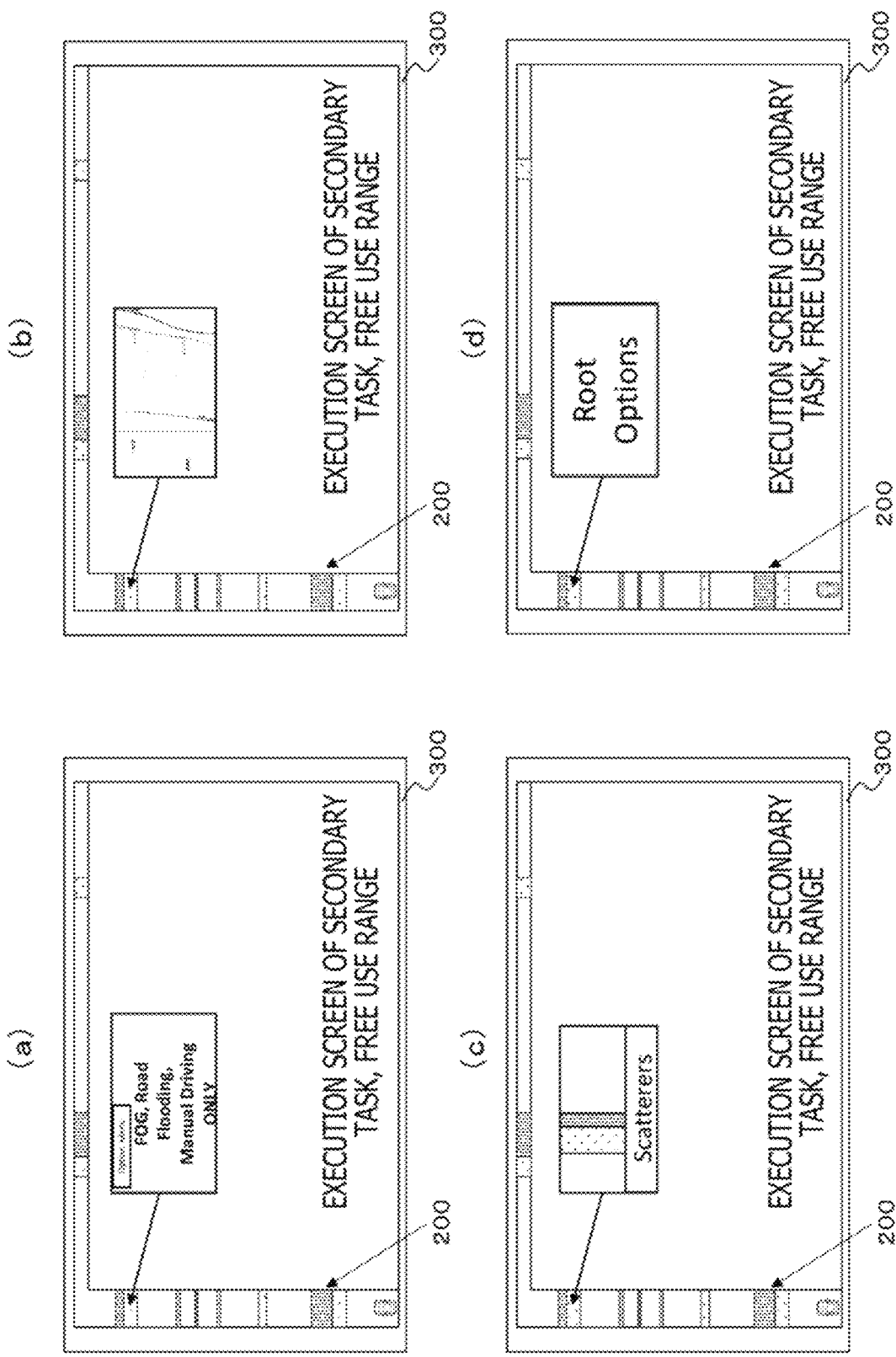
FIG. 14 depicts views each illustrating an example of information displayed in the small window.

FIGS. 14(*a*), 14(*b*), 14(*c*) and 14(*d*) each depict an example of information displayed in a small window. FIG. 14(*a*) depicts an example in which a road surface situation at the point, weather, what section the current section is and so forth are displayed in text in the small window. FIG. 14(*b*) depicts an example in which a map at the point is displayed in the small window. FIG. 14(*c*) depicts an example in which from what sections a fixed period of time including the point is configured is displayed in the small window. FIG. 14(*d*) depicts an example in which a detour is displayed in the small window. It is to be noted that those display examples are illustrative only, and they are not restrictive. Further, all of them or some of them may be sequentially switchably displayed by an operation of the driver.

Further, when a driver intervention requiring section comes into a range of a fixed period of time from the current point in a state in which the traveling section display image 200 is displayed on the screen of the tablet 300, the driver intervention requiring section is put into an emphatically displayed state to issue a notification to the driver for calling for attention. The driver will quickly perform driving return on the basis of the notification. It is to be noted that the fixed period of time for allowing, when the timing comes on the basis of a time margin necessary for driving return, a notification to be provided as a start signal to the driver is set such that it is sufficiently possible for the driver to return to driving before a driving takeover section or a cautious traveling section comes in response to the personality of the driver or in response to the current state of the driver, or further in response to loading braking characteristics of the vehicle and a situation of the road. In short, the detailed signaling point of any of such notifications as described above may be set by learning unique characteristics of driver specification and so forth by a driver individual property learner and performing the signaling at an optimum timing. Although the present specification does not specifically describe a configuration or a learning method of a learner for personal characteristics of the optimum return timing, the learner is learning equipment that estimates, from an observable state of driving, delay time when the driver returns correctly from automatic driving to manual driving at a fixed rate after the driver accepts a notification.

In an emphatically displayed state, for example, flickering display, display in a different color, illusion display by which the moving speed looks higher than an actual speed or, for example, wave display is used. This makes it possible for the driver to easily recognize that a driver intervention requiring section comes in a range of a fixed period of time from the current point. Although, from a relationship of the display range of the screen or the like, there is a case that the display scale is small in normal approach display and the approaching feeling is less likely to be grasped, to make use of the most of the dynamic eyesight effect of human eyes, then the changing point of the luminance gradient quick to the approaching location can be generated on the display screen by this method. Also in a case where the driver performs a work looking at a different location of the screen on a secondary task, it is the most significant advantage of the present method that the change can be grasped in a peripheral field of view.

Figure 15:
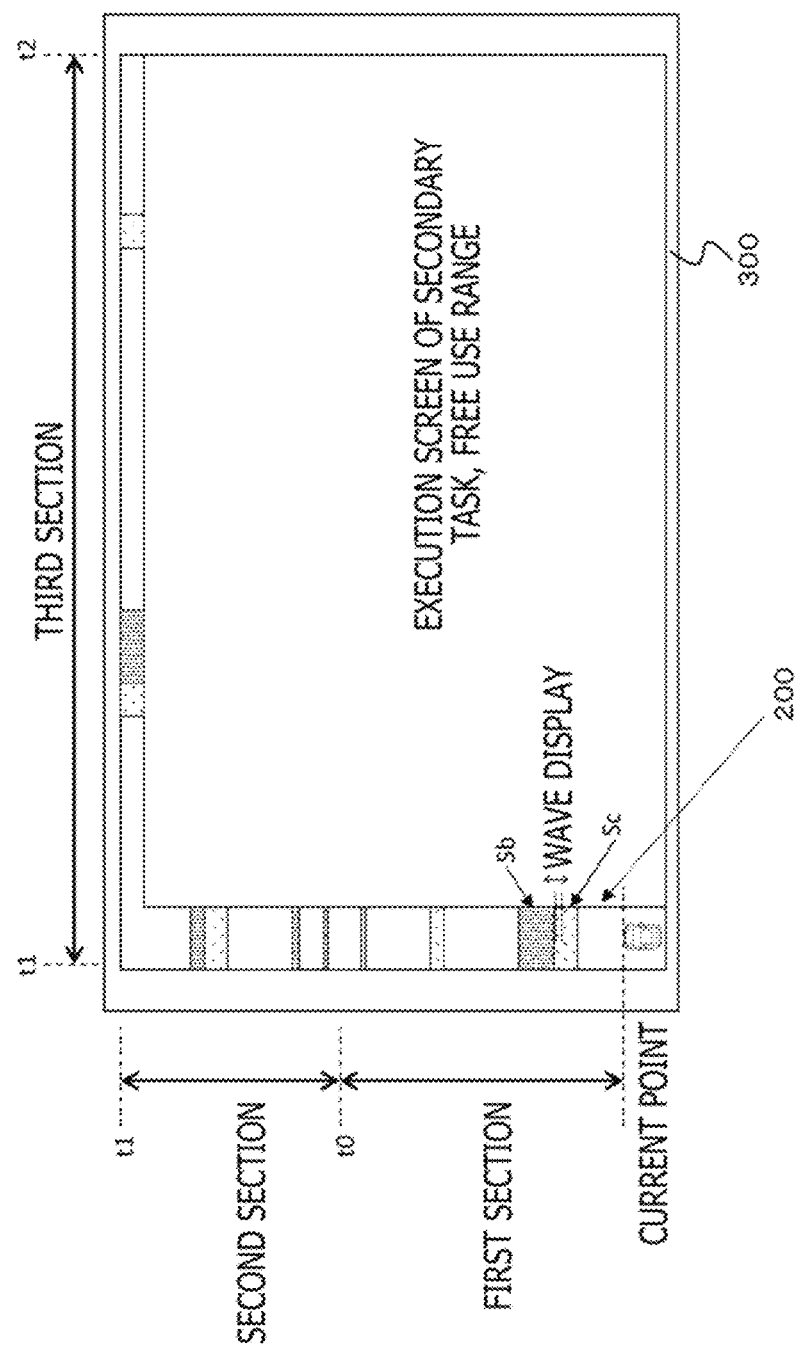
FIG. 15 is a view depicting an emphatic display (wave display) when a driver intervention requiring section comes in a range of a fixed period of time from the current spot in a state in which a traveling section display image is displayed on the screen of the tablet.
Figure 16:
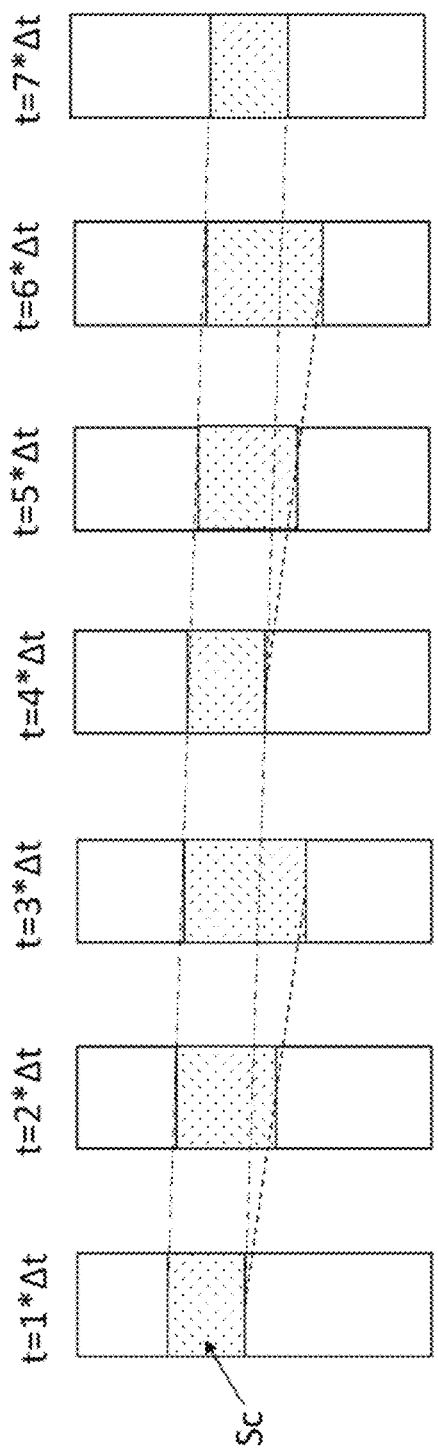
FIG. 16 is a view depicting an example of display that performs wave display.
Figure 17:
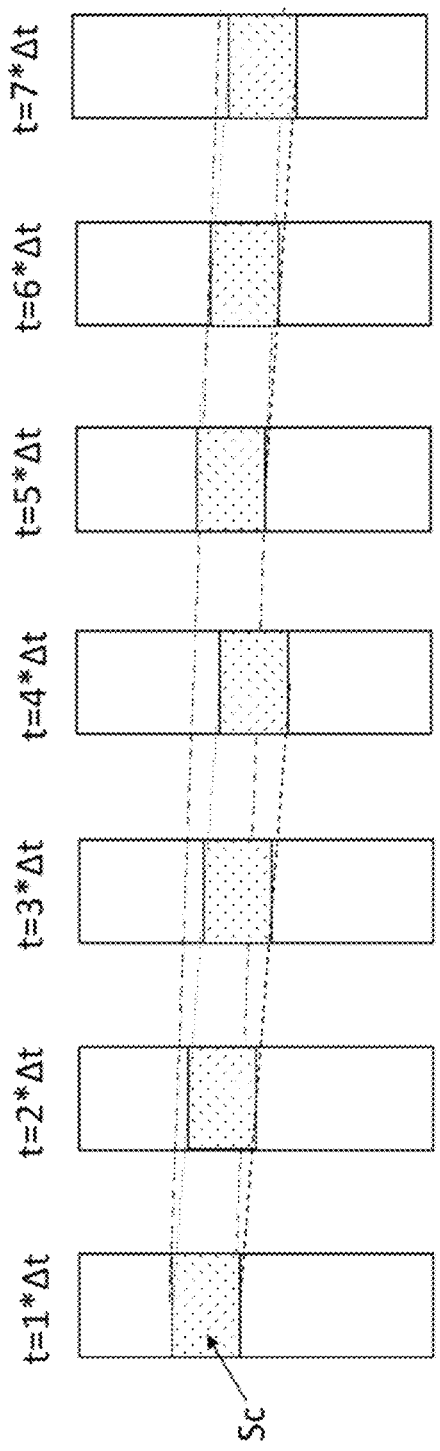
FIG. 17 is a view depicting another example of display that performs wave display.

FIG. 15 depicts that, as a state of emphatic display, a wave display is applied to a takeover section Sc existing immediately before a manual driving section Sb. FIG. 16 depicts an example of a display image in which wave display is performed. In this display example, by changing the section length of the takeover section Sc for each Δt, operations for displaying faster than the progress speed and pulling back the display image are repeated. Meanwhile, FIG. 17 depicts another example of a display image in which wave display is performed. In this display example, by changing the inter-section position of the takeover section Sc for each Δt, operations for displaying faster than the moving speed and pulling back are repeated.

Figure 18:
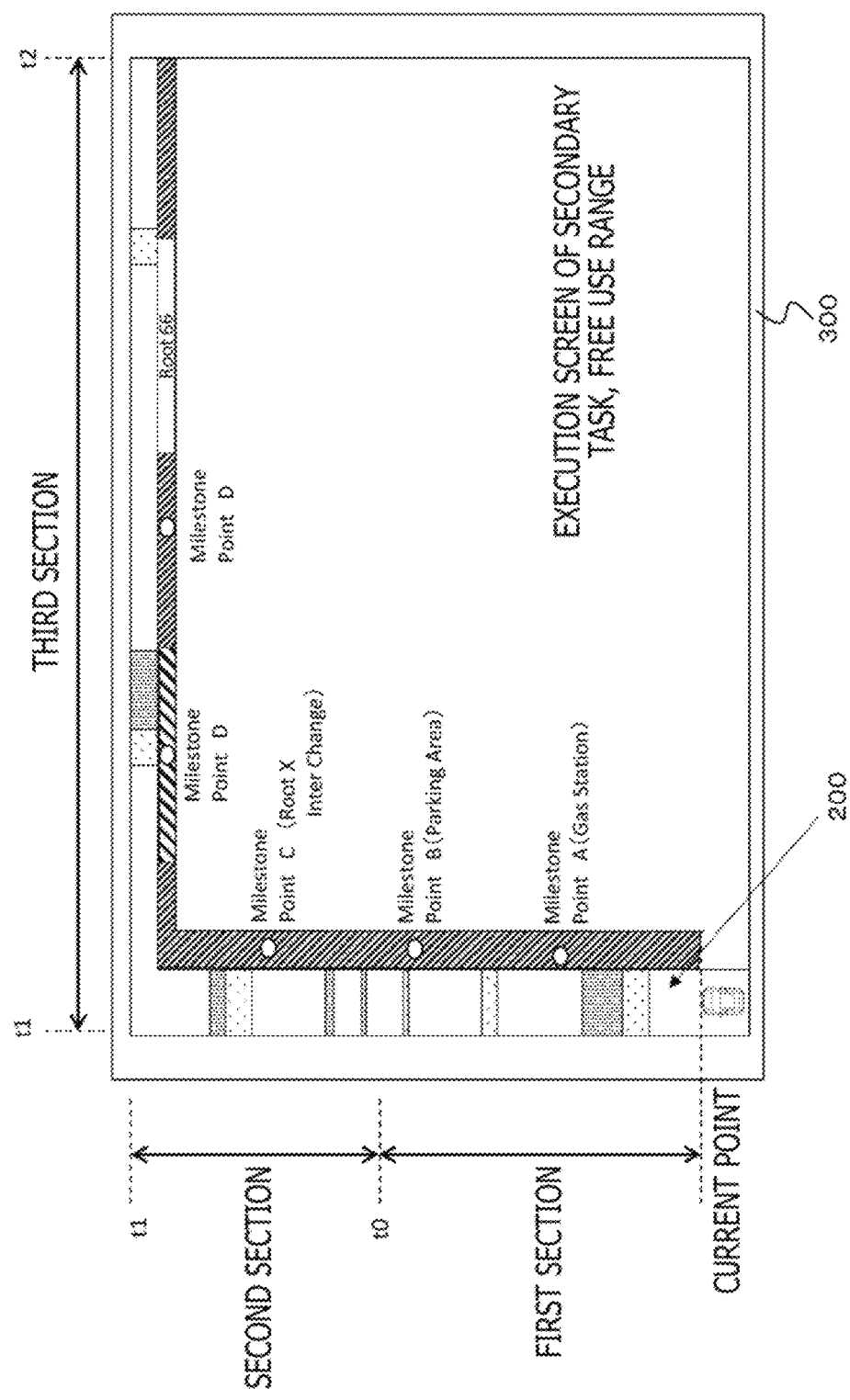
FIG. 18 is a view depicting an example in which a milestone point and so forth are further displayed in a state in which a traveling section display image is displayed on the screen of the tablet.

Further, in a state in which the traveling section display image 200 is displayed on the screen of the tablet 300, a planned passage milestone point (Milestone Point), a main route name, and so forth may be displayed concurrently with the traveling section display image 200. This milestone point is either recommended by the system or set by the driver (user). FIG. 18 depicts an example of a display image of a milestone point and so forth.

Figure 19:
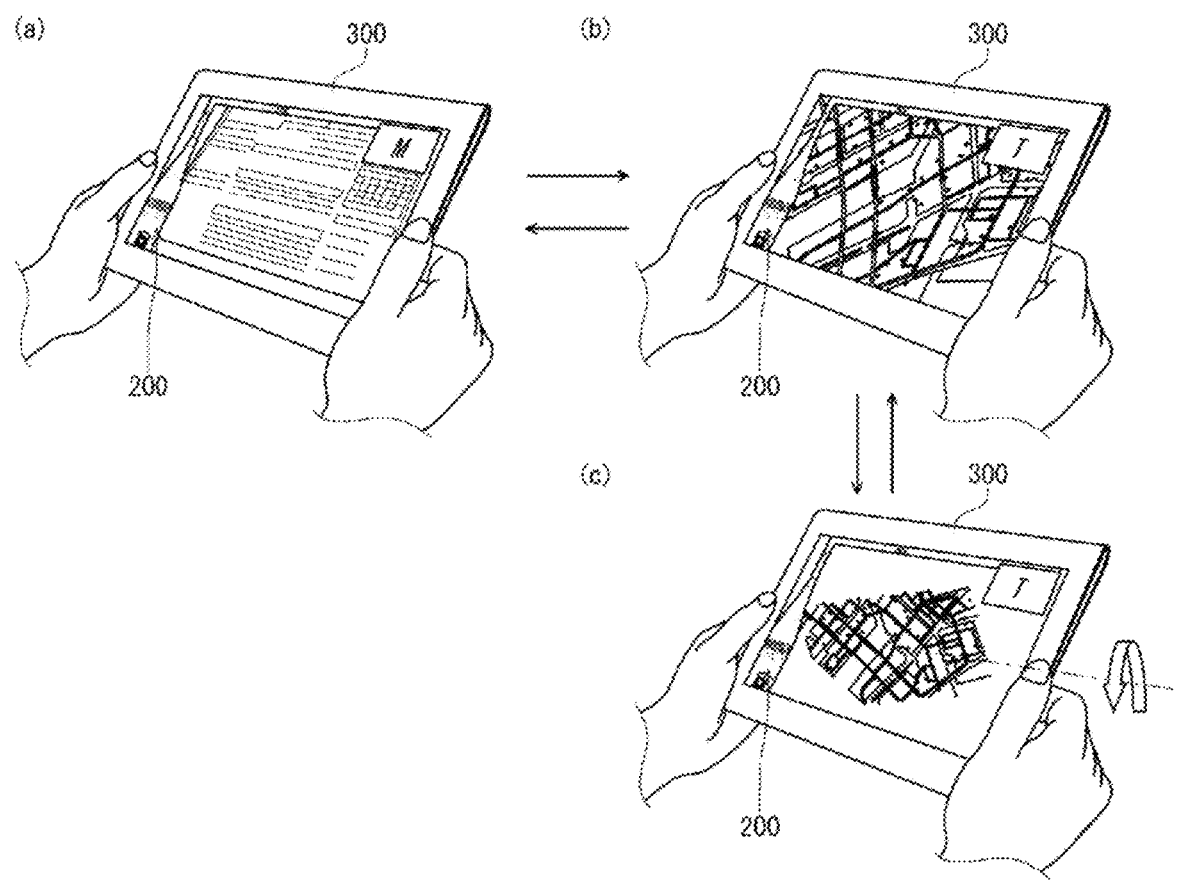
FIG. 19 depicts views each illustrating an example in which a work screen of a secondary task and a map screen can be switchably displayed further in response to a selection operation of the driver (user) in a state in which a traveling section display image is displayed on the screen of the tablet.

Further, in a state in which the traveling section display image 200 is displayed on the screen of the tablet 300, it may be made possible to further allow switchable display between a work screen for a secondary task and a map screen in response to a selection operation of the driver (user). In FIG. 19(a), a work screen for a secondary task is displayed on the screen of the tablet 300. If, in this state, a map screen icon "M" is touched after an arbitrary point of the traveling section display image 200 is triple-touched, then a state is entered in which an enlarged map at the point is displayed in a bird's eye view on the screen of the tablet 300 as depicted in FIG. 19(b).

Further, when the tablet 300 is turned along a horizontal line in the state in which the enlarged map at the applicable point is displayed on the screen of the tablet 300 in this manner, the map display enters a 3D display state as depicted in FIG. 19(c). It is to be noted that, in a case where the arbitrary point is a point very near to the current point, for example, a point in the first section, oblique 3D display is not performed and such a bird's eye view as depicted in FIG. 19(b) is maintained. This is because, in the case of the bird's eye display, the approaching time period changes in proportion to the display length and the bird's eye display allows the approaching time period to be grasped intuitively. By touching a work screen icon "T" in a state in which the enlarged map is displayed on the screen of the tablet 300, the display returns to the state of FIG. 19(a).

As described hereinabove, in the vehicle controlling system 100 depicted in FIG. 1, a driver intervention requiring section and an automatic driving available section of a traveling route are displayed on a reach prediction time axis from the current point on a display device (an instrument panel, a tablet, or the like) on the basis of traveling route information and traffic information. Therefore, section information of the traveling route can always be provided to the driver appropriately, and it becomes possible for the driver to perform secondary task execution and intervention return with clear distinction smoothly and seamlessly without having (return) waiting stress even in a complex traveling level section in which a plurality of automatic driving traveling levels are mixed complicatedly. Thus, accomplishment of traveling in a long section that makes the most of the advantages of the automatic driving mode becomes possible. Then, generally speaking, since the ratio of vehicles that fail in takeover from automatic driving to manual driving can be reduced effectively, against a significant problem of traffic bandwidth burden of roads as the social infrastructure, it is possible to minimize the negative influence thereof by introducing automatic driving widely.

2. Modifications

[Modification 1]

It is to be noted that, in the present specification, the term "system" is used to represent an aggregation of a plurality of components (apparatuses, modules (parts), and so forth) and it does not matter whether or not all components are accommodated in the same housing. Accordingly, both of a plurality of apparatuses accommodated in separate housings and connected to each other through a network and one apparatus where a plurality of modules are accommodated in a single housing are a system.

[Modification 2]

Further, in the present specification, in a case where a secondary task executed by a driver is, for example, a video conference system that includes a third party, the third party remotely connected to the driver during the secondary task cannot directly grasp a situation in regard to when it is necessary for the driver to return to driving. However, since, in this instance, it is unknown when it becomes necessary for the driver to exit from the secondary task and return to driving, the remotely connected third party cannot grasp and cannot know whether a situation for interruption of communication is imminent, which is inconvenient. Therefore, by providing return necessity timing information of a driver to a third party of a connection partner located on the opposite side of the connection screen of the video conference in which the driver is engaged, it is made well-known that the driver performs conference execution as a secondary task of a driving work. In short, also it is desirable for the connection partner to grasp the situation of a return timing of the driver, and driver intervention return request information over part of time or a fixed period of time to the partner side may be shared by communication.

Further, in order to make it possible to preferentially work on a driving return request by the system even during a conference, such means as notification to the connection partner side, situation recognition, conference continuation refusal notification may be taken. As the return request information by the system, information same as that to the driver need not necessarily be presented, and notification by voice or message display by an OSD may be used. Furthermore, in a case where voluntary driving intervention return by the driver is delayed by execution of a secondary task, the system may proceed with interruption compulsorily. Further, in order to avoid unreasonable continuation of a secondary task by the driver, a log of a return action of the driver from a return request by the system may be tracking recorded. In short, in a case where a third party remotely connects to and joins in the work of the vehicle driver during automatic driving, it is not preferable for the third party to disturb driver return to driving, and in a case where a disturbing action is performed, also it is necessary to leave a record of this.

In a case where it is necessary for the driver to return from automatic driving to manual driving, if a third party joining in a secondary task through remote connection knows whether the situation is temporary or the state continues, then the third party need not be subject to action restriction, and therefore, the convenience is improved. Here, plan display of the driver return necessity in automatic driving by the automatic driving vehicle may be notified, depending upon a use, further to a remote third party by remote communication.

In the present specification, in a case where, during a secondary task executed by the driver described above, it is requested by the system to travel under attention along the traveling route or to return to manual driving to transit to traveling, depending upon the contents of the secondary task being executed, the requesting timing may not appropriate to interrupt the work of the secondary task, in some cases.

For example, in a case where the secondary task is a nap including deep sleep, there is a case in which a timing at which the sleep is so shallow that it is suitable to return to some degree can be decided through steady state observation while the system normally and continuously observes the driver state such as depth decision of the sleep. However, in various kinds of secondary tasks the driver can take, it is very difficult to always calculate a notification timing optimum to the secondary task performed by the driver only from biological observation information of the driver and so forth that can be performed by the system.

Depending upon the type of a secondary task, there is a type of consciousness withdrawal different from the withdrawal from an extreme steering work like the sleep described above. Also an immersive game is a typical example of such a secondary task as just described. Matter of course, depending upon the way of involvement in the secondary task, the work may have the possibility that, even if the driver can start the work while paying attention forwardly, which is necessary for driving return, simultaneously depending upon the way of the involvement and depending upon the brain thinking activity, the driver may immerse himself/herself in the secondary task until the attention of the driver to the front of traveling or to a takeover notification timing degrades significantly. If the driver reaches extreme addiction like game addiction, then the driver becomes insensitive to a notification or an alert by the system, resulting in the possibility that appropriate return may not be achieved.

Further, a task that provides a similar immersive sense includes watching of sports on live television or the like. Further, it is assumed that, during a period that involves lively discussion in a telephone conference or the like, depending upon a participation situation in the discussion, the driver becomes insensitive similarly to a return notification or an alert by the system not in the conference.

Also a work for a slip inputting system to a tablet terminal apparatus can be classified to a secondary task of the type in which it is generally favorable that, from a point of view of the work efficiency, a series of inputting is performed continuously without interrupting the work and the inputting work is performed until the work settles down.

It is to be noted that, as a work that provides a milder immersive sense, for example, movie watching of a recorded video and viewing of recorded current news are available, and a work of any of those secondary tasks increases or decreases excessive attention concentration to the secondary task depending upon the content. Depending upon the current reproduction contents, the assignment of attention relating to surrounding traveling sometimes becomes neglected, or sufficient attention maintenance can sometimes be achieved, in some cases.

However, it is generally difficult to take a correlation to the depth of withdrawal from driving attention by a work. Therefore, even if passive observation of the driver state by the system can be performed, since the system cannot observe up to a thinking situation in the brain, direct observation of the attention concentration level cannot be performed, and it is difficult to achieve optimization of return notification or an alert timing.

In order to overcome this problem, there is no choice to rely upon voluntary work interruption to some degree by the driver. In order to facilitate interruption of a secondary task by the driver, it is necessary to perform reduction of factors that give rise to hesitation to interrupt a secondary task.

In the several examples given hereinabove, since the driver himself/herself cannot necessarily perform control of a degree of the progress of a reproduction video or a game, the hesitation to interrupt can be reduced depending upon how the driver can comfortably watch the contents of the secondary task continued from the interruption point when the secondary task is interrupted and reproduction is restarted from the interruption point later.

In movie watching, live sports watching on live television, or the like, if appreciation of a movie or watching of sports on live television is temporarily interrupted at a good interruption scene such as a scene next to a scene with which the emotional tension upon viewing rises and it is possible to restart appreciating or watching from the interruption point, an unsatisfactory or discomfort feeling by the intermediate interrupt can be reduced.

Further, at a point of time at which it becomes possible to restart appreciation, by providing supplementary information to the driver as a viewer upon restarting after insertion of a short summary of a story up to the interruption point or after insertion, of a highlight scene during the interruption in the case of sports live watching, it is possible to achieve reduction of unsatisfactory feeling that occurs upon secondary task interruption.

Such interruption of a secondary task for performing driving steering attention and actual steering return with the secondary task interrupted may be performed by an interruption procedure by the driver. Then, at this time, restart from the interruption point may be performed or the reproduction point may be reserved retroactively in advance so as to perform interruption. The interruption reproduction method is desirably inputted by such a method that, for example, an interruption menu is provided by single touch an appreciation monitoring screen and intuitive and rapid designation is possible such as interruption reproduction method designation or slider designation interruption of a retroactive point.

Further, in a case where specifically there is no designation, retroactive reproduction from the interruption point may be performed. Without retroactive reproduction, unlike continuous appreciation, since appreciation has been once interrupted, even if the driver watches the contents from the interruption point upon restarting the reproduction of the contents, it is difficult to grasp the story of the contents. The effect of the present reproduction method can be recognized readily if it is taken as an example that, even if a person hears a witty comment in a comedy double act some times later after hearing a funny comment, this is not funny.

As a secondary task having a higher degree of freedom in interruption, an example such as a work like data inputting to a tablet terminal, a personal computer, or the like or reading is available. In the case of data inputting, upon inputting of information into a table or the like in an interlocking relationship while several items associated with each other are checked, if the work is interrupted at a place that is not good to stop, the work that has already been done at that time may possibly become useless. Further, for inputting works for purchase through the Internet or official procedure inputting processes used often in various fields in recent years, a fixed continuous work is demanded frequently. Therefore, in a case where an inputting work for such procedure cannot be ended, if the work is interrupted on the way and the inputting work must be retroactively returned to the initial input start point upon restarting of the inputting work, it is hesitated to interrupt the inputting work.

As indicated by the example described above, relying also upon the immersion degree in the secondary task, the necessity for continuous inputting, and so forth, if a task is of the type that the driver needs to redo the task all over again from the beginning in a case where the secondary task is interrupted, even if the notification is received, the driver psychologically wants to delay the interruption of the secondary task to finish the work to a place that is good to stop, in some cases.

It is possible to cause the user to interrupt the secondary task in the first priority and encourage the user to return to the driving steering work at an early stage, when the disadvantage in a case where the work is interrupted at an early stage to take over the manual driving in the first priority is lower than the disadvantage in a case where the work of the secondary task is not interrupted and continued and the takeover to the manual driving is delayed. However, as the disadvantage in a case where the work is not interrupted and continued thereby to cause delay of the takeover, a probability that delay of the driving return occurs finally may increase. In addition, even when the takeover is not carried out in time as a result of delay on a rare case and the system causes the vehicle to travel escaping travel for emergency, for example, unless the user recognizes the effect caused by the escaping travel as intuitively disadvantageous, the user does not try to avoid the situation.

As a countermeasure for this, in a case where the system observes that the work is interrupted and the return is delayed, a mechanism for imposing a penalty on the user is effective. However, the penalty in a case where the return procedure delays is not always almighty, and as behavioral psychology of a human, the user preferentially keeps the notification of return until the user feels a direct penalty and the psychology to interrupt the secondary task does not necessarily work.

Especially, if emergency slow traveling or escape traveling for risk minimization (Minimum Risk Maneuver) by the system is performed upon generation of an urgent takeover request or when takeover is not completed in a supposed period of time, this forces peripheral traveling vehicles such as a subsequent vehicle to perform sudden braking or avoidance action, thereby causing an increase of risk such as a traffic jam or a rear-end accident. In particular, operation that relies on emergency measures performed by the system when a secondary task is forcibly continued unconditionally increases the probability that a secondary damage such as a traffic jam or rear-end accident may be caused and has an adverse effect that social functional degradation of the road infrastructure is caused.

A usage form is desirable which avoids reckless continuation of a secondary task at an early stage by a driver and encourages the driver to interrupt the secondary task quickly and start the takeover. In particular, if a penalty is generated against a violation of neglecting a motivation (incentive) and a request for early takeover, it is expected that positive, voluntary and reflective early takeover of the user becomes a habit, and also it becomes necessary to reduce demerits of cumbersomeness in this case.

In particular, while the human psychology in automatic driving utilization behavior becomes likely to rely upon automatic driving steering by the system in many traveling environments, a mechanism for prompting a voluntary return behavior to avoid laziness in performance of takeover due to over-dependence is effective, and if the balance between advantages and disadvantages upon utilization appears intuitively in operation feeling, a person starts a preferential interruption work.

As an example of a work for which continuous execution of a secondary task is supposed, movie watching, sports watching, a board game or an electronic game, conversation between passengers, discussion in a telephone conference, data inputting using an information terminal, a net banking work, texting of a mail or the like, browsing, net shopping, and so forth are available in the future.

Especially, among such secondary tasks as mentioned above, if a work is interrupted in the middle of a game, further, in the middle of a work in a case where a series of information is inputted for an inputting process of slips using an application with an information terminal such as a smartphone or a tablet, or in a case of net shopping, the inputting processing work which has been done so far all becomes wasted. As a result, a situation in which the work must be performed from the beginning (redone) possibly occurs.

Since it is desirable to eliminate wastefulness of a work as human psychology, if the psychology to complete inputting to the last works, interruption of the work is postponed, and the psychology that a little delay may be permissible works further, resulting in a risk that safe and smooth return cannot be performed after all and may not be performed in time. In other words, as long as the driver is one human and a takeover work is performed in accordance with the human behavioral psychology, a mechanism is required which interrupts a work in the behavioral psychology and prioritizes early return.

Therefore, if a mechanism that interrupts a work and prioritizes early return can be constructed, then it is expected to reduce the risk by causing the user (driver) to give up continuation of the work. Especially if the secondary task is information inputting on a tablet or the like and an explicit menu that facilitates work designation point return by the user on an execution application is prepared, then even if the user temporarily interrupts the work, the user can easily restart the work from the interruption point.

It is to be noted that application software for many personal computers and other information terminals that are popular at present is equipped with storage and recovery functions for a history of execution processing used for cancellation or redoing of inputting. However, those functions are supposed for utilization for the purpose of redoing of inputting during engagement in inputting on a terminal and are selective reflection of selectively changed contents during a review work of a document worked by a plurality of persons, but are not functions for the object of assistance in restarting of an inputting work when an unspecified arbitrary inputting work is interrupted. Therefore, the functions become a factor for causing the user to hesitate interruption of an inputting work to an information terminal as a secondary task.

In order for the user to interrupt an inputting work and preferentially return to a driving task, an assistive function for assisting restart of the inputting work or the like is demanded. In the following, working examples for assisting such return are depicted together with several uses.

Figure 20:
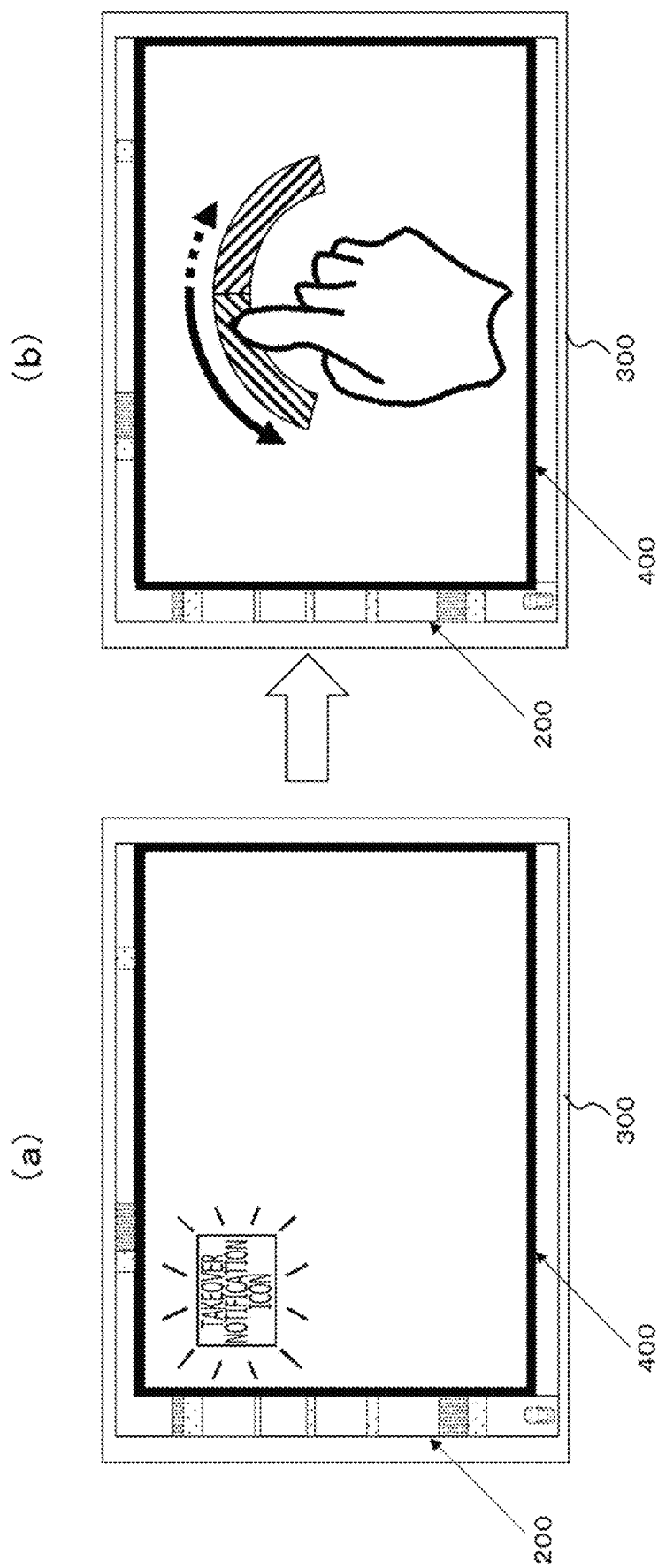
FIG. 20 depicts views each illustrating an example of a takeover notification or a restart return point designation slider menu displayed on a terminal.

In the case of performance of a secondary task utilizing an information terminal, in order to avoid full withdrawal from driving attention by an oversight in a return notification from automatic driving because of excessive immersion of the user in a secondary task, in a work window 400, index presentation (traveling section display image 200) till arrival at a takeover point by progress is performed normally. Further, if it is decided by the takeover notification decision device that it is a notification timing, a small icon for notification is displayed as a visual stimulus induction by flickering or the like in the work window 400 as depicted in FIG. 20(*a*).

In a case where the driver (secondary task performer) acknowledges the notification and performs, for example, touch with or check mark in the icon, for example, as depicted in FIG. 20(b), the work screen is interrupted (partially obstructively) and a restart return point designation slider menu for an inputting work is displayed such that free setting can be performed by slider rotation of an optimum return point by the utilizer. In this case, the slider display may be a rotational display image of the rotation type in the counterclockwise direction as depicted in FIG. 20(b), a horizontal linear display image as depicted in FIG. 21(a) or a vertical linear display image not depicted.

In the case of such a clockwise display image as depicted in FIG. 20(b), the counterclockwise direction to the nine o'clock direction from the 12 o'clock direction is determined as an input retroactive point, and in the case of such a horizontal linear slider display form as depicted in FIG. 21(a), for example, the leftward direction from a current input point that is the point at a length of approximately ⅔ is determined as an input retroactive point.

In the case of an information inputting process, the last input information point is the current point, and since a place not inputted as yet is not a point at which restart cannot be performed originally, it cannot be designated as a reproduction designation point upon restarting. However, by progressing work items on a menu, the input point is progressed to a planned inputting place on an inputting application tool, and by executing screen simulation simple display upon return inputting, an optimum point determination for restarting the work retroactively can be performed.

Since the reason is a little difficult to understand, a description thereof will be given taking high-jump in sports as an example. If the distance to be jumped over upon high-jumping can be estimated in advance, it can be determined what distance is to be assured as a distance for running. Therefore, although the running is interrupted once and the jump is performed later, by grasping the situation in advance, it can be predicted at which retroactive point the running is to be restarted. A slider design from which an input place in the future can be postponed and browsed is measures for this. This merit is useful in a case where the remaining input items are checked.

In a case where fixed time lapse transition or acknowledgment response inputting of the driver to the notification is not performed in response to the notification and the system fails in confirmation of response detection of the driver, it is reasonable to issue a warning to prompt early return. For example, index presentation (traveling section display image 200) till arrival at a takeover point in the moving direction is displayed in an enlarged scale like a traveling section display image 200' as depicted in FIG. 21(b) while the secondary task execution window 400 is reduced, and in some cases, the application inputting being executed as a secondary task may be force-quit.

Figure 22:
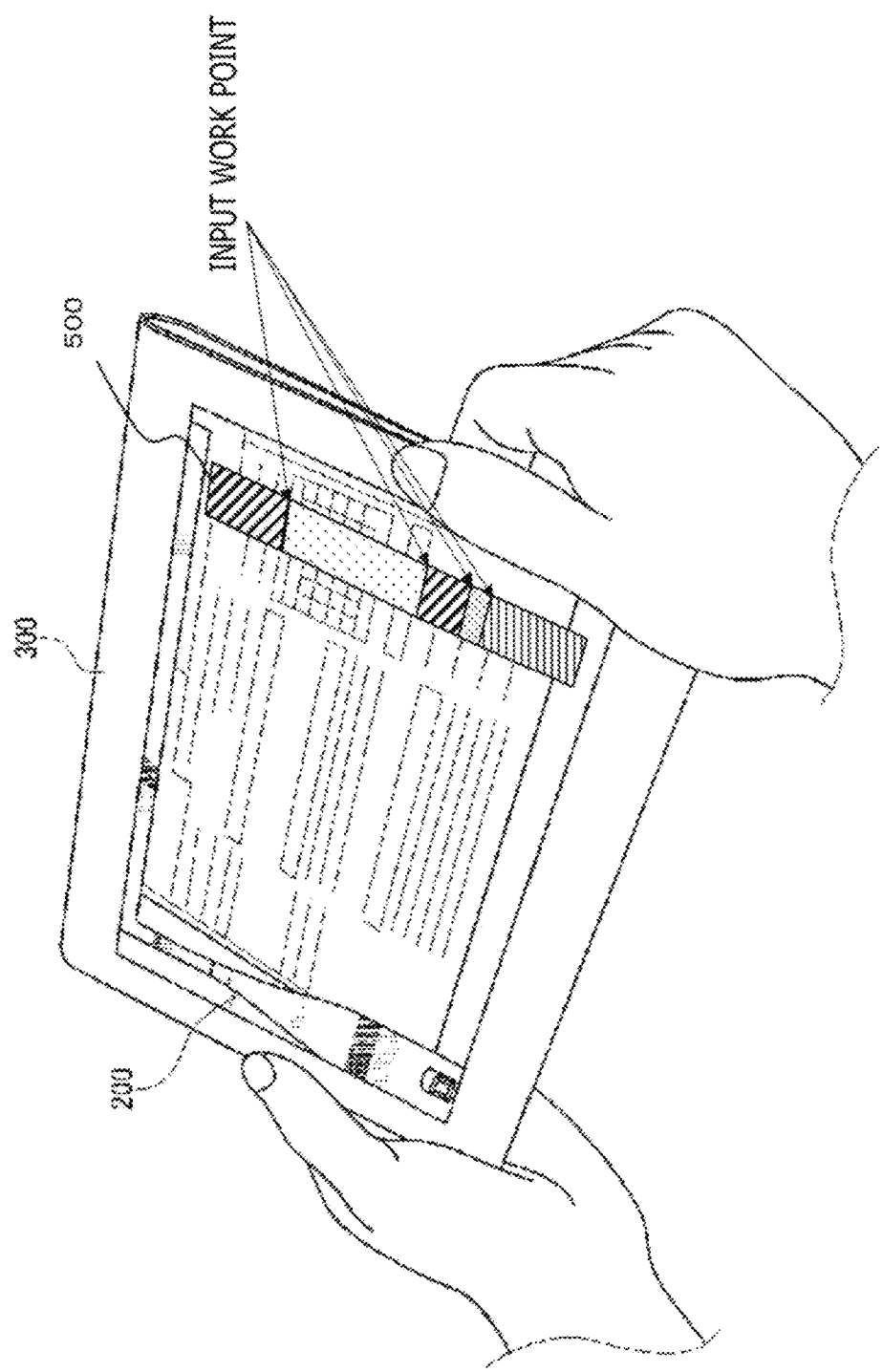
FIG. 22 is a view depicting an example of a display of a slider menu that designates a work restart point displayed on a terminal.

In a case where the driver who is executing a secondary task designates a work restart point and interrupts the work once in response to a return request by the system and the driver can return to automatic driving again as a flow and restarts the work, as depicted in FIG. 22, a slider menu (slider for return place designation with an input history on the screen upon restarting) 500 in which input work points (a CR (enter keyboard Carriage Return) execution point to an input work point and an input form completion point) are lined up explicitly in chronological order may be presented. It is to be noted that, although the restart after interruption of the work once need not necessarily be performed after return to automatic driving and may be performed after the end of the itinerary, an example of the applicable case is omitted in the flow chart.

Especially, if there is no necessity to designate a particular restart point, the slider may be closed by a process for slidably moving the slider with double fingers or by a close menu. Alternatively, a restart point may be designated by inputting a numerical value, hitting Carriage Return, moving the slider to a location at which work restarting is desired to be performed among a plurality of points and designating the applicable location by double touch or checkmark operation.

These designation of the return point and the operation are made to coincide with each other, and the designation location is moved on the slider, so that it is also effective to reproduce an input screen on an application execution screen. Also upon restarting of the work, by displaying a work progress menu partitioned for each input return key in a slider, the inputting person can easily check an interruption place and an input history that has been done so far, and therefore, this becomes an interface by which the interruption point can be recalled readily.

Especially, since an input work point of a terminal work and a reach point of a traveling environment on a tablet or the like can be grasped intuitively by the user, not only an execution task of a secondary task and display update information are temporarily displayed simply to the driver but also a synchronous record with the task may be further stored into a recording apparatus such that the task playback function and so forth can be used together by a scroll of a section approach window involved in the progress on the menu and a screen double touch or triple touch operation with a work recovery point and so forth.

By providing means for work return point search and return markers with which return of the work to an arbitrary work point is readily possible after driving return to the driver in this manner, reckless continuation of a secondary task can be avoided from an ergonomic perspective. As a result, since the driver who is executing the secondary task starts driving return quickly without stress, this leads to achievement of utilization of safer automatic driving can be implemented.

Especially, in an inputting work, an interaction between preceding and succeeding pieces of input information is important, and for example, in a case where a plurality of pieces of related information are successively inputted into a table or the like, in a case where an item is selected and a series of information interlocked with the item are to be inputted, if inputting is interrupted at a place that is not good to stop under an incomplete condition, depending upon the memory of the driver upon restart the work, there is the possibility that time may be required to recall the interruption place or incorrect input may occur.

In particular, in a case where an application interface that presupposes ordinary continuous use remains as it is, when an inputting work is interrupted on the way and a work with attention different from the inputting work required is performed during the interruption, there is an adverse effect when the driver returns to the interruption place precisely upon work return and continues the work. By performing explicit visualization of a menu for exclusive use for work interruption point designation or of an inputting location, upon work return, the driver recalls the memory of the inputting work to allow for easy work restart.

The input screen change history till the time of interruption of inputting a secondary task is an effective auxiliary function for recalling an input restart point and is useful in improvement of the work efficiency. Especially in a work in which a browsing effect of history information is high but is heavy in recalculation, it is also possible to omit the recalculation process by locally storing screen changes as images over last several stages.

Although the example described above is a flow as viewed from a point of view of data inputting to an information terminal principally as an information inputting application, a similar operation flow is applicable also to movie watching, sports watching and streaming viewing of a news program. In the case of movie watching or watching a competition game such as the soccer which is being broadcasted on a television, it is effective to temporarily and locally store the broadcast, interrupt reproduction display at a timing at which manual driving return is requested once and perform delayed reproduction from the middle of the work by the driver. At this time, it is possible to lower the necessity for the cumbersome rewound playback process.

However, in a case where an extreme utilization form such as particularly VR utilization in a participatory game that provides a sense of deep immersion is performed, also it is effective to not only force the driver to interrupt the work but also force the driver to view forward traveling information by switching display of the screen such that the forward traveling information is displayed in the secondary task screen, causing the driver to return his/her attention from a state in which the driver is fully withdrawn from the driving traveling work, at an early stage.

In a case where the advantages obtained by interrupting a secondary task work during automatic driving can be felt in the short term only in safety and reliable and smooth takeover at a takeover limit point, the necessity for the same is not felt intuitively. Therefore, although a stepwise penalty function is effective to cause the user to feel the necessity for start of intuitive return and to prompt an action, alert using an alarm or haptics is cumbersome and punishment only cannot always improve the human behavioral psychology. However, by combining a mechanism for supporting restart and return upon the secondary task interruption that cancels the disadvantages, it is possible to grow the psychology of rapid interruption of the secondary task and habitually reduce reckless continuation of the secondary task.

Figure 23:
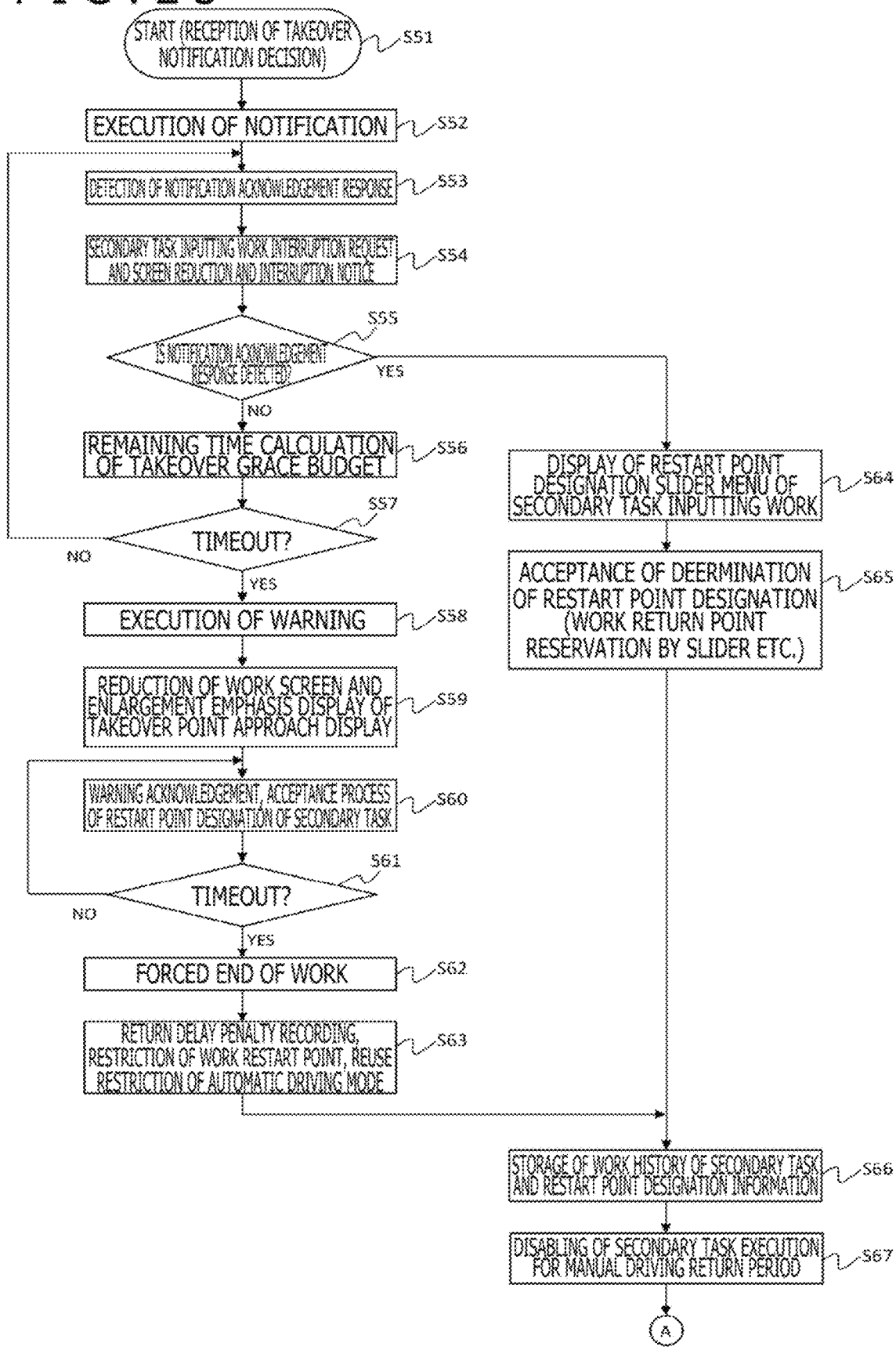
FIG. 23 is a flow chart (½) depicting an example of a processing procedure of the system in a case where a takeover notification decision is received.
Figure 24:
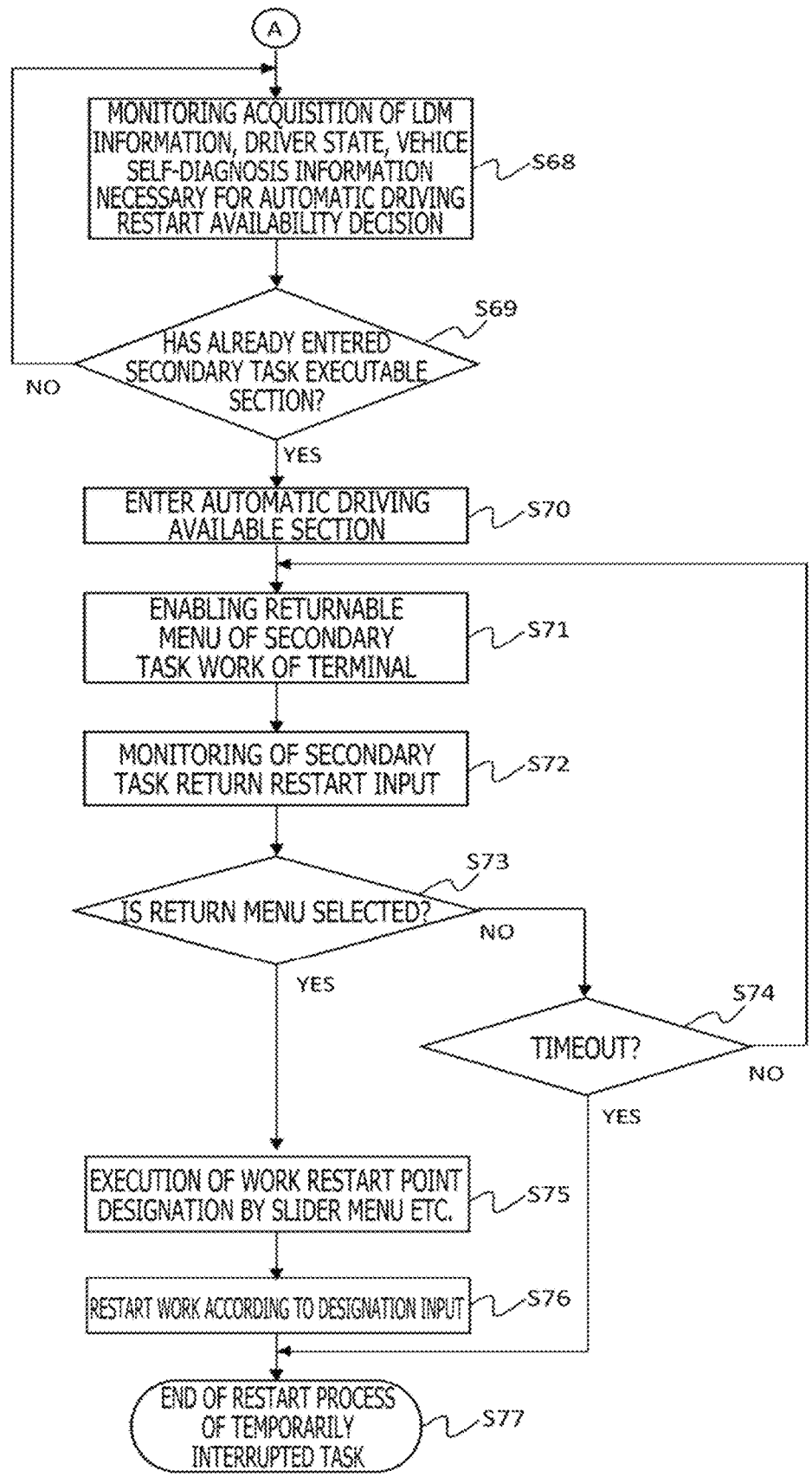
FIG. 24 is a flow chart (½) depicting the example of the processing procedure of the system in the case where the takeover notification decision is received.

Flow charts of FIGS. 23 and 24 depict an example of a processing procedure of the system in a case where a takeover notification decision is received.

At step S51, the system starts processing when it receives a takeover notification decision. Then, at step S52, the system executes notification to a performer of a secondary task. For example, in a case where a secondary task in which an information terminal is used is performed, a small icon for notification is flickered or the like in a work window 400 (refer to FIG. 20(a)).

Then at step S53, the system detects notification acknowledgement response of the performer of the secondary task. For example, in a case where the secondary task utilizing an information terminal is performed and a small icon for notification is flickered or the like as a notification in the work window 400 as described above, for example, a touch operation or the like by the performer with the icon is detected. Further, at step S54, the system issues an interruption request of the inputting work of the secondary task to the performer of the secondary task and gives a notice for screen reduction and interruption.

Then at step S55, the system discriminates whether or not a notification acknowledgement response is detected. If a notification acknowledgement response is not detected, the system calculates a remaining time period for a takeover grace budget at step S56. Then, at step S57, the system discriminates on the basis of the remaining time period calculated at step S56 whether or not it is a timeout. If it is not a timeout, the system returns to step S53 to repeat processes similar to those described above.

In contrast, if it is a timeout at step S57, the system executes warning using sound, vibration, an image, or the like at step S58. Then, at step S59, the system performs reduction of a work screen image and enlargement emphasis display of a takeover point approach display (refer to FIG. 21(b)). Then, at step S60, the system performs an acceptance process of warning acknowledgment and restart point designation of the secondary task. In this case, the system displays a restart point designation slider menu for the secondary task inputting work and performs acceptance of determination of the restart point designation (work return point reservation by a slider or the like) by the secondary task performer (refer to FIGS. 20(b) and 21(a)).

Then, at step S61, the system discriminates whether or not it is a timeout. In this case, the timeout is discriminated at a point of time at which takeover delay is predicted by the takeover grace time period decision. If it is not a timeout, the system continues the process at step S60. In contrast, if it is a timeout, the system forcibly ends the work of the secondary task at step S62. Then at step S63, the system executes return delay penalty recording, restriction of the work restart point, reuse restriction of the automatic driving mode and so forth.

Conversely, when a notification acknowledgement response is detected at step S55 described above, the system displays a restart point designation slider menu for the secondary task inputting work at step S64 and then performs acceptance of determination of the restart point designation (work return point reservation by a slider or the like) by the secondary task performer (refer to FIGS. 20(b) and 21(a)). Then, after the process at step S65, the system advances to a process at step S66. Also after the process at step S63 described hereinabove, the system advances to the process at step S66.

At step S66, the system saves a work history and the restart point designation information of the secondary task. Then, at step S67, the system decides that it is a manual driving return period and execution of the secondary task is disabled.

Then, at step S68, the system monitors and acquires LDM information, driver states and vehicle self-diagnosis information necessary for automatic driving restart availability decision. Then, at step S69, the system determines whether or not the vehicle has entered again into an executable section of the secondary task. If the vehicle has not entered again the executable section of the secondary task, the system continues the process at step S68. In contrast, if the vehicle has entered again the executable section of the secondary task, the system determines automatic driving available section entry at step S70.

Then, at step S71, the system enables a returnable menu of a secondary task work of the terminal. Then, at step S72, the system monitors a secondary task return restart input. Then, at step S73, the system determines whether or not selection of the return menu is performed by the performer of the secondary task. If selection of the return menu is not performed, the system determines at step S74 whether or not it is a timeout (restart designation waiting time timeout). If it is not a time out, the system returns to the process at step S71 to repeat processes similar to those described hereinabove. The timeout decision performed at step S74 may be a procedure that, in a case where the driver does not perform secondary task restart within a fixed period of time, interruption of the work equivalent to transition to a standby mode that is an energy saving mode of a terminal or the like, a pause mode in which interruption information for turning off the power supply fully is recorded to close the work or the like is performed such that loss of the work contents that have been done so far is avoided by manual driving return that requires long-term work interruption.

When the selection of the return menu is performed at step S73, if the work restart point designation is performed through a slider menu or the like by the system at step S75, at step S76, the system performs work restart in accordance with the designation input. Thereafter, the system ends the series of processes at step S77. It is to be noted that, when it is a timeout at step S74, the system immediately advances to step S77 to end the series of processes.

[Modification 4]

Further, in the present specification, in a case where, during a secondary task executed by the driver as described above, the secondary task is interrupted on the basis of traveling under caution along a traveling route or manual driving return request information to prioritize manual driving return, there possibly is a case in which the timing at which return is demanded to the driver not necessarily is a timing that is good for interruption of the secondary task being executed. Especially, there possibly is a situation in which, in a case where a series of information is to be inputted, if the work is interrupted on the way, then the inputting processing work that has been done so far must all be re-inputted from the beginning. Since, as human psychology, it is desired to eliminate wastefulness of a work, it is tried to finish inputting to the last. However, this involves a risk that return is not performed in time. Therefore, as risk reduction measures, an explicit menu that facilitates work designation point return by the user on an execution application of a secondary task may further be provided auxiliarily. Especially, since an inputting work point of a terminal work on a tablet or the like and a reaching point of a traveling environment can be grasped intuitively by the user, not only an execution task of the secondary task and display update information are temporarily presented to the driver simply such that a task playback function and so forth can be used by both of a scroll of a section approach window together with traveling on a menu and a screen double touch or triple touch operation of a work recovery point or the like but also synchronous recording with the task may be further stored into a recording apparatus. By providing means returnable to an arbitrary work point after driving return to the driver in this manner, reckless continuation of the secondary task can be avoided from an ergonomic point of view. As a result, the driver who is executing the secondary task starts driving return quickly without a stress, and this leads to implementation of utilization of safer automatic driving.

[Modification 5]

Further, in the case of traveling support in which remote support by wireless communication is received in operation in a line traveling, a remote supporter may control the traveling speed at a support requiring point for the applicable vehicle or vehicle group to perform planned allocation or perform distribution planning avoiding concentration of support of the traffic control center. Further, the traveling support may be utilized for planning or the like of building a distribution plan between an automatic delivery partner and a manual delivery partner by a delivery company, and utilization of the traveling support may be further expanded to delivery remote support and so forth.

[Modification 6]

Further, the embodiment of the present technology is not limited to the embodiment described hereinabove and can be modified in various manners without departing from the subject matter of the present technology. For example, the present technology can take a configuration for cloud computing by which one function is shared and cooperatively processed by a plurality of apparatuses through a network.

Further, the steps described in the description of the flow charts given hereinabove not only can be executed by a single apparatus but also can be shared and executed by a plurality of apparatuses. Further, in a case where one step includes a plurality of processes, the plurality of processes included in the one step can be executed by a single apparatus and also can be executed by sharing by a plurality of apparatuses.

It is to be noted that the present technology can take also such configurations as described below.

(1) An information processing apparatus including:

an information acquisition unit configured to acquire traveling route information and traffic information relating to the traveling route; and a display controlling unit configured to display a driver intervention requiring section and an automatic driving available section of the traveling route on a reach prediction time axis from a current point on a display device on the basis of the traveling route information and the traffic information.

(2) The information processing apparatus according to (1) above, in which the driver intervention requiring section includes a manual driving section, a takeover section from automatic driving to manual driving, and a cautious traveling section from the automatic driving.

(3) The information processing apparatus according to (2) above, in which the display controlling unit displays the automatic driving available section in a first color, displays the manual driving section in a second color, and displays the takeover section and the cautious traveling section in a third color.

(4) The information processing apparatus according to any one of (1) to (3) above, in which the display controlling unit displays a first section from the current point to a first point on a first time axis, displays a second section from the first point to a second point in a time axis that sequentially changes from the first time axis to a second time axis reduced at a predetermined ratio with respect to the first time axis, and displays a third section from the second point to a third point on the second time axis.

(5) The information processing apparatus according to (4) above, in which the display controlling unit displays the first section with a first width, displays the second section with a width that sequentially changes from the first width to a second width smaller than the first width, and displays the third section with the second width.

(6) The information processing apparatus according to (4) above, in which the display controlling unit displays the driving vehicle intervention requiring section in the third section with a fixed time length even if the driving vehicle intervention requiring section actually is equal to or smaller than the fixed time length.

(7) The information processing apparatus according to any one of (1) to (6) above, in which the display controlling unit further displays information relating to a point designated in each of the displayed sections.

(8) The information processing apparatus according to any one of (1) to (7) above, in which the display controlling unit displays the driving vehicle intervention requiring section that appears newly so as to be identifiable from the existing driving vehicle intervention requiring section.

(9) The information processing apparatus according to any one of (1) to (8) above, in which when the driver intervention requiring section comes in a range of a fixed period of time from the current point, the display controlling unit puts the driver intervention requiring section into an emphatically displayed state.

(10) The information processing apparatus according to any one of (1) to (9) above, in which the display controlling unit displays display images in the sections in parallel to a work window.

(11) The information processing apparatus according to any one of (1) to (10) above, the display device being a display device provided in a portable terminal, and the information processing apparatus further including:

a communication unit configured to communicate with the portable terminal.

(12) An information processing method including:

by an information acquisition unit, a step of acquiring traveling route information and traffic information relating to the traveling route; and by a display controlling unit, a step of displaying a driver intervention requiring section and an automatic driving available section of the traveling route on a reach prediction time axis from a current point on a display device on the basis of the traveling route information and the traffic information.

REFERENCE SIGNS LIST

100 . . . Vehicle controlling system
101 . . . Inputting unit
102 . . . Data acquisition unit
103 . . . Communication unit
104 . . . In-vehicle apparatus
105 . . . Output controlling unit
106 . . . Outputting unit
107 . . . Drive-train system controlling unit
108 . . . Drive-train system
109 . . . Body controlling unit
110 . . . Body system
111 . . . Storage unit
112 . . . Automatic driving controlling unit
121 . . . Communication network
131 . . . Detection unit
132 . . . Self-position estimation unit
133 . . . Situation analysis unit
134 . . . Planning unit
135 . . . Motion controlling unit
141 . . . Outside-vehicle information detection unit
142 . . . In-vehicle information detection unit
143 . . . Vehicle state detection unit
151 . . . Map analysis unit
152 . . . Traffic rule recognition unit
153 . . . Situation recognition unit
154 . . . Situation prediction unit
161 . . . Route planning unit
162 . . . Action planning unit
163 . . . Motion planning unit
171 . . . Emergency avoidance unit
172 . . . Acceleration/deceleration controlling unit
173 . . . Direction controlling unit

The invention claimed is:

1. An information processing apparatus comprising:
processing circuitry configured to:
acquire traveling route information and traffic information relating to the traveling route; and
control display of a driver intervention requiring section and an automatic driving available section of the traveling route on a time axis from a current point on a display device on a basis of the traveling route information and the traffic information, wherein the processing circuitry is configured to
control display of a first section of the time axis from the current point to a first point, the first section having a first time scale,
control display of a second section of the time axis from the first point to a second point with a time scale that changes from the first time scale to a second time scale reduced at a predetermined ratio with respect to the first time scale,
control display of a third section of the time axis from the second point to a third point with the second time scale, and
control display of the driving vehicle intervention requiring section in the third section with a prescribed time length even if the driving vehicle intervention requiring section actually is equal to or smaller than the prescribed time length.

2. The information processing apparatus according to claim 1, wherein
the driver intervention requiring section includes a manual driving section, a takeover section from automatic driving to manual driving, and a cautious traveling section from the automatic driving.

3. The information processing apparatus according to claim 2, wherein
the processing circuitry is configured to control display of the automatic driving available section in a first color, control display of the manual driving section in a second color, and control display of the takeover section and the cautious traveling section in a third color.

4. The information processing apparatus according to claim 1, wherein
the processing circuitry is configured to
control display of the first section with a first width,
control display of the second section with a width that sequentially changes from the first width to a second width smaller than the first width, and
control display of the third section with the second width.

5. The information processing apparatus according to claim 1, wherein
the processing circuitry is configured to control display of information relating to a point designated in each of the driver intervention requiring section and the automatic driving available section.

6. The information processing apparatus according to claim 1, wherein
the processing circuitry is configured to control display of the driving vehicle intervention requiring section that appears newly so as to be identifiable from the existing driving vehicle intervention requiring section.

7. The information processing apparatus according to claim 1, wherein when the driver intervention requiring section comes in a range of a fixed period of time from the current point, the processing circuitry is configured to put the driver intervention requiring section into an emphatically displayed state.

8. The information processing apparatus according to claim 1, wherein
the processing circuitry is configured to control display of images in the driver intervention requiring section and the automatic driving available section in parallel to a work window.

9. The information processing apparatus according to claim 1,
the display device being a display device provided in a portable terminal, and
the information processing apparatus further comprising:
processing circuitry configured to communicate with the portable terminal.

10. An information processing method executed by processing circuitry, the method comprising:
acquiring traveling route information and traffic information relating to the traveling route; and
controlling display of a driver intervention requiring section and an automatic driving available section of the traveling route on a time axis from a current point on a display device on a basis of the traveling route information and the traffic information, including
controlling display of a first section of the time axis from the current point to a first point, the first section having a first time scale,
controlling display of a second section of the time axis from the first point to a second point with a time scale that changes from the first time scale to a second time scale reduced at a predetermined ratio with respect to the first time scale,
controlling display of a third section of the time axis from the second point to a third point with the second time scale, and
controlling display of the driving vehicle intervention requiring section in the third section with a prescribed time length even if the driving vehicle intervention requiring section actually is equal to or smaller than the prescribed time length.

11. A non-transitory computer readable medium storing instructions that, when executed by processing circuitry, perform an information processing method comprising:
acquiring traveling route information and traffic information relating to the traveling route; and
controlling display of a driver intervention requiring section and an automatic driving available section of the traveling route on a time axis from a current point on a display device on a basis of the traveling route information and the traffic information, including
controlling display of a first section of the time axis from the current point to a first point, the first section having a first time scale,
controlling display of a second section of the time axis from the first point to a second point with a time scale that changes from the first time scale to a second time scale reduced at a predetermined ratio with respect to the first time scale,
controlling display of a third section of the time axis from the second point to a third point with the second time scale, and
controlling display of the driving vehicle intervention requiring section in the third section with a prescribed time length even if the driving vehicle intervention requiring section actually is equal to or smaller than the prescribed time length.

* * * * *